(12) United States Patent
Martin

(10) Patent No.: US 9,151,859 B2
(45) Date of Patent: Oct. 6, 2015

(54) SEISMIC ARRAY TOWING SYSTEM

(75) Inventor: Daniel G. Martin, Woodstock (CA)

(73) Assignee: CGGVERITAS SERVICES (U.S.) INC., Houston, TX (US)

( * ) Notice: Subject to any disclaimer, the term of this patent is extended or adjusted under 35 U.S.C. 154(b) by 679 days.

(21) Appl. No.: 12/634,169

(22) Filed: Dec. 9, 2009

(65) Prior Publication Data

US 2010/0149910 A1 Jun. 17, 2010

Related U.S. Application Data

(60) Provisional application No. 61/122,183, filed on Dec. 12, 2008.

(51) Int. Cl.
*G01V 1/38* (2006.01)

(52) U.S. Cl.
CPC .................................. *G01V 1/3826* (2013.01)

(58) Field of Classification Search
CPC .................................................. G01V 1/3826
USPC ........................................................ 367/15–20
See application file for complete search history.

(56) References Cited

U.S. PATENT DOCUMENTS

| | | | | |
|---|---|---|---|---|
| 4,574,723 | A * | 3/1986 | Chiles et al. ................... | 114/253 |
| 4,709,355 | A | 11/1987 | Woods et al. | |
| 5,443,027 | A * | 8/1995 | Owsley et al. ................. | 114/244 |
| 6,028,817 | A | 2/2000 | Ambs | |
| 6,226,225 | B1 | 5/2001 | Barker ............................. | 367/17 |
| 7,800,976 | B2 * | 9/2010 | Stokkeland et al. ............ | 367/16 |
| 2005/0279268 | A1 | 12/2005 | Storteig et al. | |
| 2006/0227657 | A1 | 10/2006 | Tveide et al. | |
| 2006/0256653 | A1 | 11/2006 | Toennessen et al. ............ | 367/17 |
| 2007/0019504 | A1 * | 1/2007 | Howlid et al. ................... | 367/16 |
| 2007/0025182 | A1 | 2/2007 | Robertsson | |
| 2010/0118645 | A1 * | 5/2010 | Welker ............................ | 367/17 |

FOREIGN PATENT DOCUMENTS

| | | | |
|---|---|---|---|
| GB | 2122562 A | * | 1/1984 |
| WO | WO 2009/148898 | | 12/2009 |

OTHER PUBLICATIONS

Search Report issued in United Kingdom Application No. GB0921835.5, mailed Apr. 22, 2010.
International Search Report completed on Jan. 22, 2010 during the prosecution of International Application No. PCT/US2009/067343.

\* cited by examiner

*Primary Examiner* — Krystine Breier
(74) *Attorney, Agent, or Firm* — Patent Portfolio Builders PLLC

(57) ABSTRACT

A system for a more efficient towing of a marine seismic array comprising one or more diverters attached to each lead-in cable. Because each lead-in cable has its own diverter, the need for dedicated towing ropes and taglines between lead-in cables is eliminated, thereby reducing the overall drag and fuel consumption. The diverters of the present invention are directly attached to the respective lead-in cables and are submerged, eliminating the need for taglines and additional flotation. The diverter of the present invention comprises of either a single span-wise hydro foil or two foil sections and is steerable. Similarly, the diverters of the present invention can be installed on the umbilical cables of seismic source subarrays to obtain the same benefits. As such, at least one diverter of the present invention can be attached directly to at least one umbilical cable of the seismic source subarray.

35 Claims, 16 Drawing Sheets

SEISMIC ARRAY TOWING SYSTEM

CROSS-REFERENCE TO RELATED APPLICATIONS

This application claims the benefit of U.S. Provisional Application No. 61/122,183 filed on Dec. 12, 2008, which is incorporated herein in its entirety.

TECHNICAL FIELD

The present disclosure relates generally to marine seismic surveying and, in particular, a method and apparatus for seismic surveying using at least one wing unit, or diverter, per lead-in line, which is an optical-electrical-mechanical towing leader cable, and/or per umbilical cable. More specifically, the present disclosure concerns the attachment of a single or multiple wing units, or diverters, to each lead-in cable to eliminate the need for taglines, dedicated towing ropes, and large paravanes, thereby reducing the overall drag, fuel consumption, and time required to perform stacking operations.

BACKGROUND OF THE INVENTION

In seismic surveying, geophysicists direct mechanically generated, low frequency acoustic energy waves into the earth and record the waves reflected back to study the structure and nature of the rock layers below the surface. In typical 3D seismic surveying at sea, a seismic vessel tows a series of seismic cables or streamer cables behind it along with at least one energy source. Further, acoustic signals are generated by a series of air guns, arranged in a subarray, which is also towed behind the seismic vessel. Data about the geological formations at or below the ocean floor is gathered by sending sound waves from one or more sources down into the sea bottom. The various types of formations reflect the waves back differently. The sensors on the streamer cables of the marine seismic array receive the reflected signals for subsequent analysis. The seismic vessel tows the seismic array of streamer cables along a specified path to perform the desired survey in a chosen area. As such, an efficient towing configuration of the marine seismic array is desirable, e.g., minimal drag, where the streamer cables remain at their assigned depth and lateral offset.

At present, a typical configuration of marine seismic arrays is an eight-streamer configuration. In the prior art, the mechanisms used to maintain the cable separation include paravanes and smaller diverters. Traditionally, the towing method consists of two main paravanes acting as port and starboard side diverters, with the paravanes deployed on dedicated synthetic tow ropes. The two main paravanes are used to provide the lift force necessary to separate multiple streamers across a wide lateral swath. In this classic cable configuration, a chain of taglines or separation ropes is used to daisy-chain one streamer to the next. This chain of taglines starts at the paravane and leads inboard.

Another known towing mechanism is to replace the main paravanes with smaller diverters. This method is similar to the paravane configuration in that it can duplicate the same number, length, and separation of streamers. These smaller diverters are towed from the lead-in cables themselves instead of individual main paravanes on the port and starboard sides that are deployed from dedicated tow ropes. This configuration eliminates the drag of the tow ropes, and in some cases, also eliminates the drag from some of the separation ropes as well. Although the cumulative effect of this configuration is an incremental reduction in towing burden, this configuration still does not address the current and future demands of seismic array towing.

To improve efficiency of seismic surveying at sea, the spreads of streamer cables continue to grow both in terms of the number of streamers deployed and the separation between adjacent streamers. At the time of writing, typical configurations for large 3D surveys are 10 to 12 streamer cables, with expectations that this will increase in the future to 14 or 16 streamer cables for the most modern vessels. As such, either adding streamer cables or spreading streamer cables wider increases the towing burden of the seismic vessel and requires more lift from the paravanes or other similar means. With a conventional paravane, more lift translates to a larger device and larger, more sophisticated handling and rigging techniques. Larger paravanes mean more room is taken up on the seismic vessel to store the paravanes, and more fuel is consumed to tow them and the rigging equipment.

Further, deployment of seismic arrays with more streamer cables and/or more separated streamers will require substantially more time in stacking operations to recover the paravanes or various cables for inspection, maintenance, or repair. Recovery of the main paravanes is typically conducted every 6 weeks, which causes a delay in survey operations for 12 to 24 hours. The stacking operation of the seismic array using conventional paravanes for lift is additionally time consuming because it requires the following steps: (1) further release, or pay-out, of the lead-in and streamer cables on one side, e.g., port side, for extra spread to accommodate the cables to be stacked, e.g., starboard side cables; (2) hauling in of the lead-in cables to be stacked to exchange long separation ropes between the cables for shorter taglines; and (3) repeating steps (1) and (2) in reverse to re-deploy the recovered paravane or streamer cable once it is inspected and/or repaired.

The novel design of the present invention overcomes these problems associated with mechanisms known in the art and can be applied to a marine seismic array of as few as two streamer cables. For example, conventional paravanes produce substantial drag because they require tow ropes, vane tethers, and separation ropes. The present invention reduces the drag significantly by eliminating the conventional paravanes themselves, along with the gear required to operate them with the rest of the array. As such, a towing configuration using the present invention can be expected to generate up to 35% less drag than the conventional paravane configuration. This drag reduction will result in reduced fuel consumption for the seismic vessel, faster achievable production speeds for the vessel, and increased flexibility to tow more aggressive arrays, e.g., longer or more streamers and wider area of separation between the streamers. Further, due to the reduced drag and improved efficiency of the present invention, the cumulative wing area of the multiple deployed wing units of the present invention can be reduced by up to 50% as compared to conventional paravanes. As such, there is a reduction in the required stowage space on the seismic vessel.

Moreover, by eliminating the use of paravanes, it is no longer necessary to perform stacking operations every 6 weeks to inspect the paravanes, thereby eliminating the periodic interruptions in data collection that occur in prior art. While stacking is still required from time to time to repair or replace various cables, the present invention provides for an improved stacking operation that significantly reduces the necessary time to complete the operation. By eliminating the conventional paravanes themselves, along with the necessary operating gears such as separation ropes, additional pay-outs of cables are no longer necessary during the stacking procedure. The present invention also eliminates the required replacement of longer separation ropes with shorter tag lines. Further, by employing at least one steerable wing unit on each lead-in cable that can perform a 180 degree roll, the lead-in cables of the present invention can be forced to move in the opposite direction, e.g., from a port side lateral position to a starboard side lateral position, or vice versa. One skilled in the art will realize that other design techniques can be employed to achieve the same purpose of being able to steer a streamer across the center line of the towed equipment spread. As such, stacking of the cables can be performed quickly and easily without the need to retrieve the cables to be stacked.

Further, in conventional configurations, the lateral separations between cables are set at the time of deployment via separation ropes with fixed lengths that will likely stretch over time, leading to significant deviations in the pre-established separations. The only solution is to recover the ropes, re-adjust their lengths, and re-deploy the array. This process can cause a delay in the surveying operation of 4 to 8 hours. The present invention eliminates the use of separation ropes, thereby saving the cost of rope replacements and the time required to replace these ropes.

Also, with at least one dedicated wing unit per lead-in cable, each successive streamer cable can be deployed to its production position and left in place. There is no longer a need to partially recover the cables each time taglines and separation ropes are connected or disconnected, as in the conventional methods in the prior art. This significantly reduces deployment and retrieval times for the whole marine seismic array. Further, by eliminating all taglines, the present invention eliminates the risk of chafing of the array that can result in subsequent partial or total collapse of the seismic array. Also, the present invention provides for steerable wing units, providing the flexibility to control the attack angle of each wing unit and the lateral spacing of individual lead-in cables and streamer cables.

In view of the growing interest in super-wide arrays, the increased performance demands of conventional rigging technologies, and the limitations of known products, there is a great need for a durable, efficient, and cost-effective towing system to meet the challenging requirements of super-wide arrays. The present disclosure provides a system and method that reduces the towing burden and fuel consumption required for towing seismic array of any size. Further, the system and method disclosed herein overcomes the challenges of deploying and towing new super-wide arrays having more than eight streamers and/or larger separations. Additionally, the present disclosure provides a number of other advantages and benefits over the current configuration employing smaller diverters especially in terms of overall production efficiency.

BRIEF SUMMARY OF THE INVENTION

The present invention is directed to a system and method that provides for a marine seismic array that enables more efficient towing, less drag, and easier stacking operations. The preferred embodiment of the present invention has one or more lead-in cables, where each lead-in cable has a first end engaged with a seismic vessel and a second end attached to a seismic streamer, and one or more diverters directly attached to each cable. In embodiments where multiple diverters are attached to the lead-in cables, the diverters are preferably distributed more closely at the second end of the cables than at the stern of said vessel. In other embodiments, the diverters are distributed evenly between the stern of the vessel and the second end of the cable. Also, another embodiment of the present invention has one or more umbilical cables, where each umbilical cable has a first end engaged with a seismic vessel and a second end attached to a seismic source, and one or more diverters directly attached to at least one umbilical cable. That is, one diverter can be attached to more than one umbilical cables or each umbilical cable can have one or more diverters attached.

In some embodiments, the diverter is submerged under water such that it does not require a dedicated surface reference float.

In some embodiments, the diverter is capable of executing a 180 degree roll around the axis of the lead-in cable such that it generates lift in the opposite lateral direction to its initial orientation.

In some embodiments, the diverter comprises a single hydrofoil.

In some embodiments, the diverter comprises a substantially rectangular foil body, a first pod attached to a first end of the foil, and a second pod attached to a second end of the foil, and the foil body is bent outward at the first and second ends.

In some embodiments, the diverter further comprises a slot traversing laterally on said foil body.

In some embodiments, the diverter comprises a foil body, a first end, and a second end, where the chords at the ends of the foil body are narrower than the chord at the center of the foil.

In some embodiments, the diverter comprises a series of individual foils, a first end, and a second end, where the series of individual foils are placed between the first and second ends such that there are gaps between the series of foils to allow flow through the diverter.

In some embodiments, the span area of the diverter is between 1 m$^2$ and 6 m$^2$.

In some embodiments, the hydrofoil diverter is directly attached to the lead-in cable through an attachment means.

In some embodiments, the attachment means comprises at least one swivel clamp attached to said one or more cables and at least one leg, where a first end of the leg is attached to the hydrofoil diverter and a second end of the leg is attached to the swivel clamp.

In some embodiments, the attachment means further comprises a restraint means, where a first end of the restraint means is attached to the single hydrofoil diverter and a second end of said restraint means is attached to a second swivel clamp.

In some embodiments, the restraint means comprises a hunting restraint rope.

In some embodiments, the single hydrofoil diverter is attached directly to the lead-in cable through a second swivel clamp.

In some embodiments, the length of the leg is adjustable so that the angle of attack of the single hydrofoil diverter is controlled by adjusting the leg length.

In some embodiments, the length of the leg is adjusted remotely.

In some embodiments, the length of the leg is automatically adjusted to maintain a desired lateral position of the diverter.

In some embodiments, the angle of attack of the diverter is set by adjusting the location of where the leg is attached to the diverter along the chord of the diverter.

In some embodiments, the location of where the leg is attached to the diverter is remotely controlled.

In some embodiments, the location of where the leg is attached to the diverter automatically moves along the chord of the diverter to maintain a desired lateral position of the diverter.

In some embodiments, the diverter comprises an upper foil section and a lower foil section, where the diverter is directly attached to the lead-in cable at the junction between said upper and lower foil sections.

In some embodiments, the upper foil section moves independently of lower foil section so that the diverter can execute a 180 degree roll around the axis of the lead-in cable such that it generates lift in the opposite lateral direction to its initial orientation.

In some embodiments, the diverter further comprises a first aileron attached to the tail of the upper foil section, and a second aileron attached to the tail of the lower foil section, where the angle of attack of the diverter is controlled by adjusting either the first or second aileron or both.

In some embodiments, adjustment of either the first or second aileron or both is performed remotely.

In some embodiments, either first or second ailerons or both automatically adjusts the angle of attack of the diverter to maintain a desired lateral position of the diverter.

In some embodiments, the diverter further comprises one or more struts having a first end and a second end and at least one tail wing, where the first end of the strut is attached to the tail wing and the second end the strut is attached to the tail of the foil section.

In some embodiments, the struts have a series of pins located at various lengths of the struts so that the distance between the tail wings and the tail of the upper and lower sections is adjustable.

In some embodiments, adjustment of the tail wing is performed remotely.

In some embodiments, the tail wing automatically adjusts the angle of attack of the diverter to maintain a desired lateral position of the diverter.

In some embodiments, the upper and lower foil sections comprise a plurality of centers of yaw rotation, where the selected center of yaw rotation sets the angle of attack of the diverter.

In some embodiments, the diverter is adjusted to produce a near-zero lift, and it is directed to execute a 180 degree roll so the attached lead-in cable is moved laterally in the opposite direction.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DESCRIPTION OF THE PRIOR ART

Figure 1:
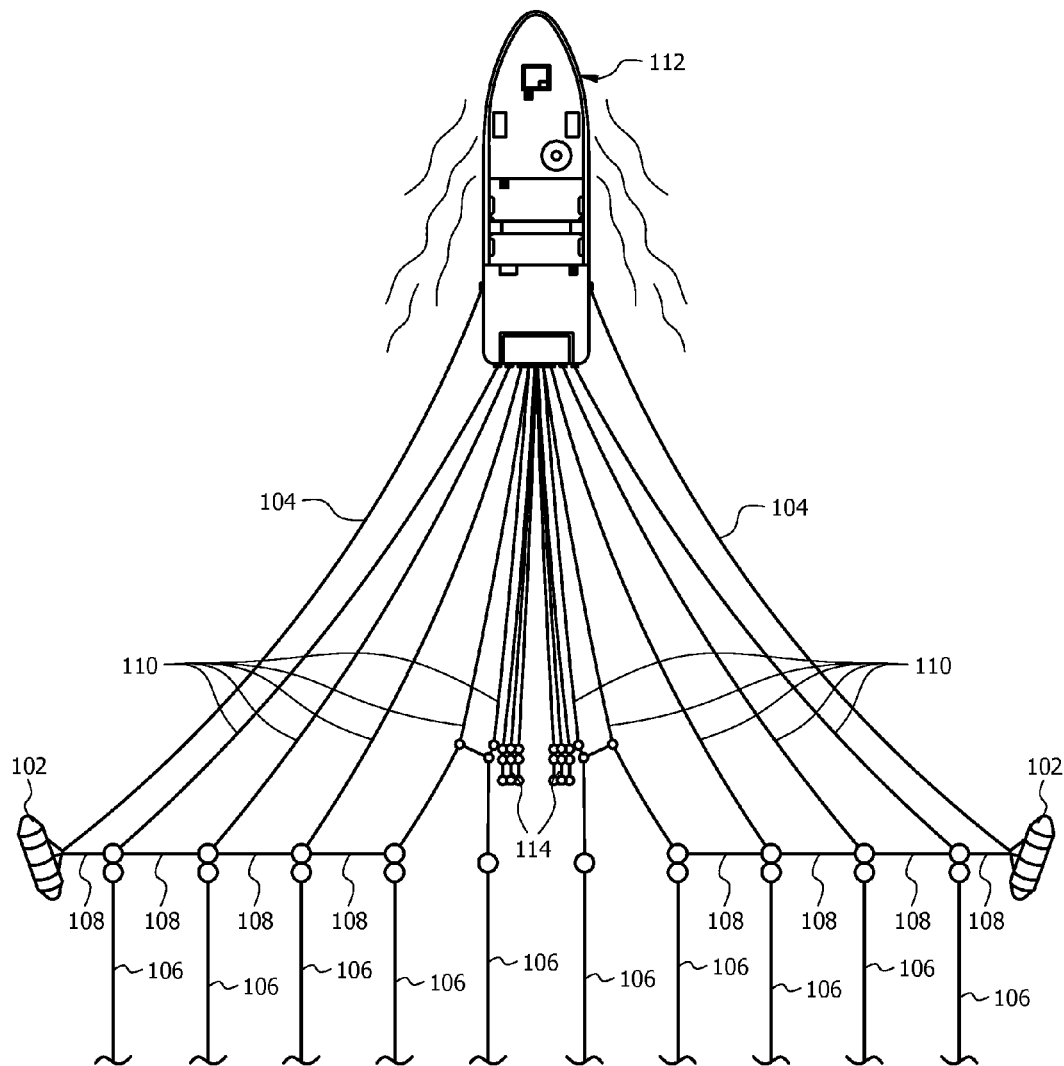
FIG. 1 is a top view of a conventional seismic array configuration using paravanes found in the prior art.

Before discussing the towing configuration of the present invention, it will be useful to discuss other towing techniques found in the prior art. FIG. 1 depicts the top view of the conventional marine seismic array towing configuration consisting of two main paravanes, one on the port side and one on starboard side; ten streamer cables, five on the port side and five on the starboard side; and two seismic sources. As can be seen in FIG. 1, the prior art conventional configuration has paravanes 102 deployed on dedicated synthetic tow ropes 104. Tow ropes 104 provide the towing force necessary to overcome the drag of paravanes 102 and pull paravanes 102 through the water behind seismic vessel 112. The outermost cables, which are the port and starboard vane tethers, of separation ropes 108 allow for the lift generated by paravanes 102 to be transmitted laterally to separate streamer cables 106 from one another, in a daisy chain fashion, across a wide lateral swath. Also, lead-in cables 110 are connected to streamer cables 106, and thereby, lead-in cables 110 are also separated from one another. This chain of separation ropes, or tag lines, 108 starts at paravanes 102 and leads inboard. As can be seen, there is significant drag created by tow ropes 104 and separation ropes 108.

Figure 2:
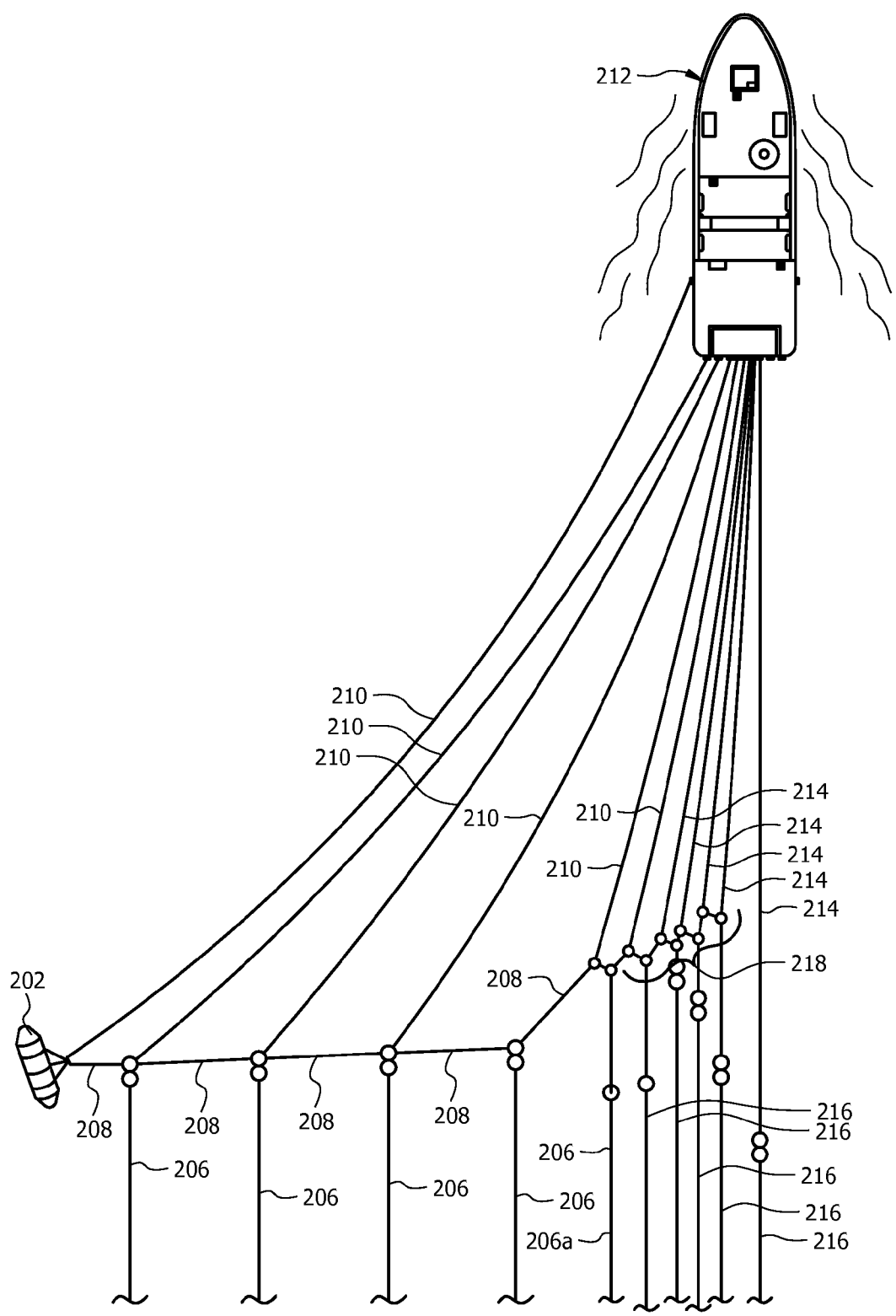
FIG. 2 is a top view of the stacking operation of the conventional configuration depicted in FIG. 1.

FIG. 2 illustrates the top view of the stacking operation of the starboard side of the conventional paravane towing configuration illustrated in FIG. 1. As can be seen in FIG. 2, the stacking operation illustrated here is to stack the starboard side cables. To achieve the stacking depicted in FIG. 2, both seismic sources 114 must be recovered; hence, FIG. 2 does not show any seismic sources. Next, all five of the port side lead-in cables 210 must be further released, or paid out, to provide the extra spread necessary to accommodate the starboard side lead-in cables 214 and streamer cables 216 that are going to be stacked. In addition, innermost port side streamer 206a is paid out another 50 meters to move it over further as well.

Subsequently, each starboard side cable is hauled in, one by one, until the separation rope connection is accessible at the stern of vessel 212. The longer separation ropes (108 in FIG. 1) are disconnected from each of lead-in cables 214. These separation ropes are replaced by shorter taglines 218, where one end of the shorter taglines 218 is connected to lead-in cables 214 while the other end is fitted with slider 220. As can be seen, the first slider 220 is attached to a port side lead-in cable 210, and subsequent sliders 220 can be attached to adjacent lead-in cables 214. The starboard side lead-in cables 214, with taglines 218 and sliders 220 attached, are then paid all the way out again until the attached streamers 216 are moved closer to the port side streamers 206.

As shown by FIG. 2, all five starboard-side streamers 216 are disconnected from their separation ropes and are streaming straight behind vessel 212. At this point, starboard paravane (not depicted) can be recovered and inspected. This entire operation is repeated in reverse once the starboard paravane is ready to be re-deployed. That is, lead-in cables 214 and streamers 216 must be hauled into the stern of vessel 212 to reconnect the longer separation ropes and remove sliders 220. The starboard lead-in cables 214 and streamers 216 are then re-deployed, and the additional paid out of port side lead-in cables 210 must be retrieved. Further, the position of streamers 206 and 216 must be adjusted to re-establish the original depth and lateral offset. This procedure can be used to recover any streamers for inspection and repair, not just the paravanes. As such, the stacking operation of the conventional configuration is very time consuming.

Figure 3:
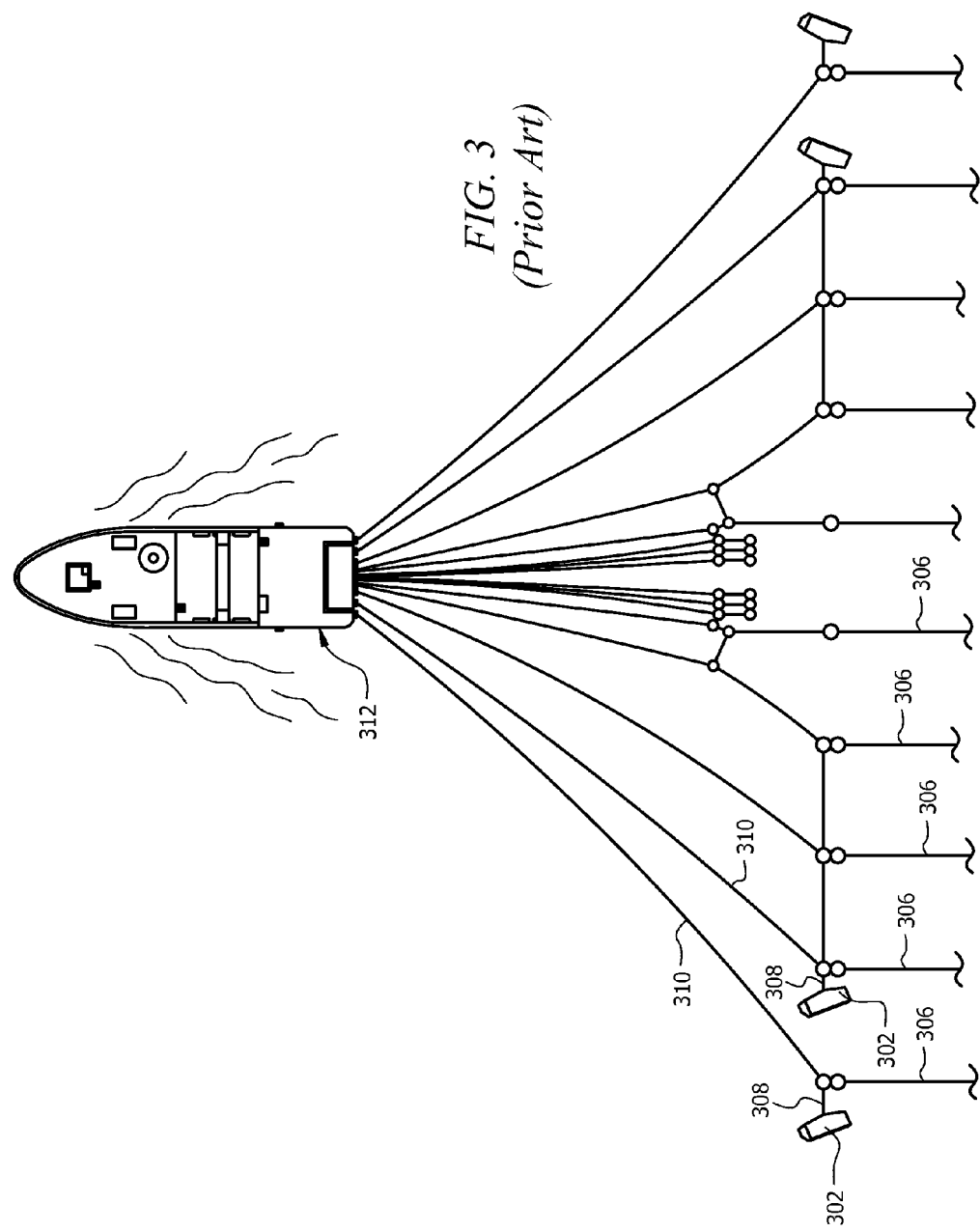
FIG. 3 is a top view of a seismic array configuration using smaller diverters found in the prior art.

FIG. 3 depicts the top view of the prior art configuration that replaces the main paravanes with smaller diverters in a similar seismic array. For simplicity's sake, only the port side is labeled, but it is to be understood that the starboard side mirrors the port side here, as in FIG. 1. As can be seen in FIG. 3, smaller diverters 302 are towed directly from lead-in cables 310. Smaller diverters 302 still require surface reference floats (not shown) because they are attached to lead-in cables 310 via taglines 308. As shown, smaller diverters 302 replace main paravanes 102 of FIG. 1 and reduce the length of taglines 308, as compared to the length of taglines 108 in FIG. 1. Consequently, this configuration using smaller diverters 302 eliminates the drag of tow ropes 102 of FIG. 1, as well as several taglines or separation ropes 108 of FIG. 1. The cumulative effect of this configuration is a reduction in total towing burden. Nevertheless, such reduction is limited by the fact that this configuration still must employ some taglines or separation ropes 308 and additional surface reference floats for smaller diverters 302.

DETAILED DESCRIPTION OF THE INVENTION

Figure 4:
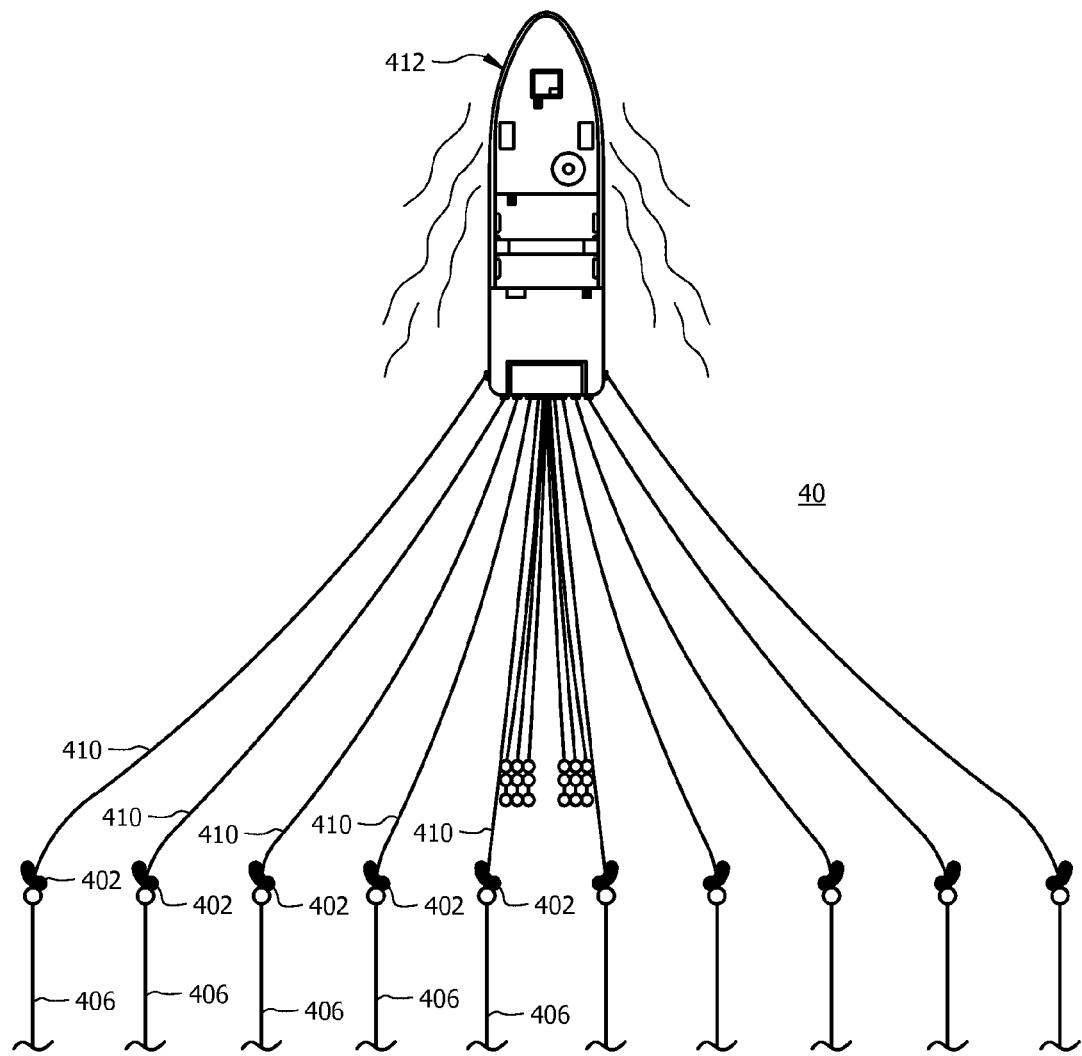
FIG. 4 is a top view of the preferred embodiment of the present invention.

Turning now to FIG. 4, the port and starboard sides of the preferred embodiment of the present invention are shown as seismic array 40. In the preferred embodiment, at least one wing unit 402 is installed on each lead-in cable 410. As can be seen in FIG. 4, because each lead-in cable 410 has at least one wing unit 402, seismic array 40 eliminates the need for taglines and dedicated towing ropes, thereby reducing the overall drag and fuel consumption. Also, such an arrangement eliminates the handling gear and deck space associated with the paravanes, tow ropes, and separation ropes. Unlike the towing configurations found in the prior art, each wing unit 402 is fastened to its lead-in cable 410 directly. That is, each wing unit 402 is attached to its lead-in cable 410 rather than being tethered via taglines. As such, wing units 402 are preferably completely sub-surface, i.e., fully submerged. In other embodiments, however, it is envisioned that wing units 402 can be at least partially sub-surface. In the preferred embodiment, wing units 402 do not require additional individual floatation devices, unlike the prior art. Accordingly, wing units 402 being sub-surfaced and the lack of extra floatation devices allow seismic array 40 to further avoid the usual penalties associated with additional free surface interactions, e.g., air entrainment, that lead to loss of efficiency.

In the preferred embodiment shown in FIG. 4, wing units 402 are more closely distributed at the heads of streamer cables 406 rather than the stern of seismic vessel 412. In other embodiments, however, wing units 402 can be evenly distributed between the heads of streamers 406 and the stern of vessel 412. The distribution or spacing of wing units 402 on lead-in cables 410 is flexible and can be tailored to suit handling, deployment and configuration objectives for the seismic array.

In the preferred embodiment, wing units 402 are smaller than the diverters of the prior art. One advantage of the small size of wing unit 402 is that the intensity of the associated tip vortices are significantly reduced. In the preferred embodiment, the wingspan of wing unit 402 is between 2 meters and 4 meters. It is envisioned, however, that in other embodiments, the span of wing unit 402 can be modified to be larger than 4 meters or smaller than 2 meters to suit the specific needs of the particular seismic array. Moreover, wing unit 402 may be configured to generate reverse lift, such that cables deployed on the port side may be moved over to the starboard side or vice versa. Hence, wing units 402 are steerable, i.e., capable of being moved on command, and this maneuverability provides significant advantages during cable stacking operations.

Figure 5:
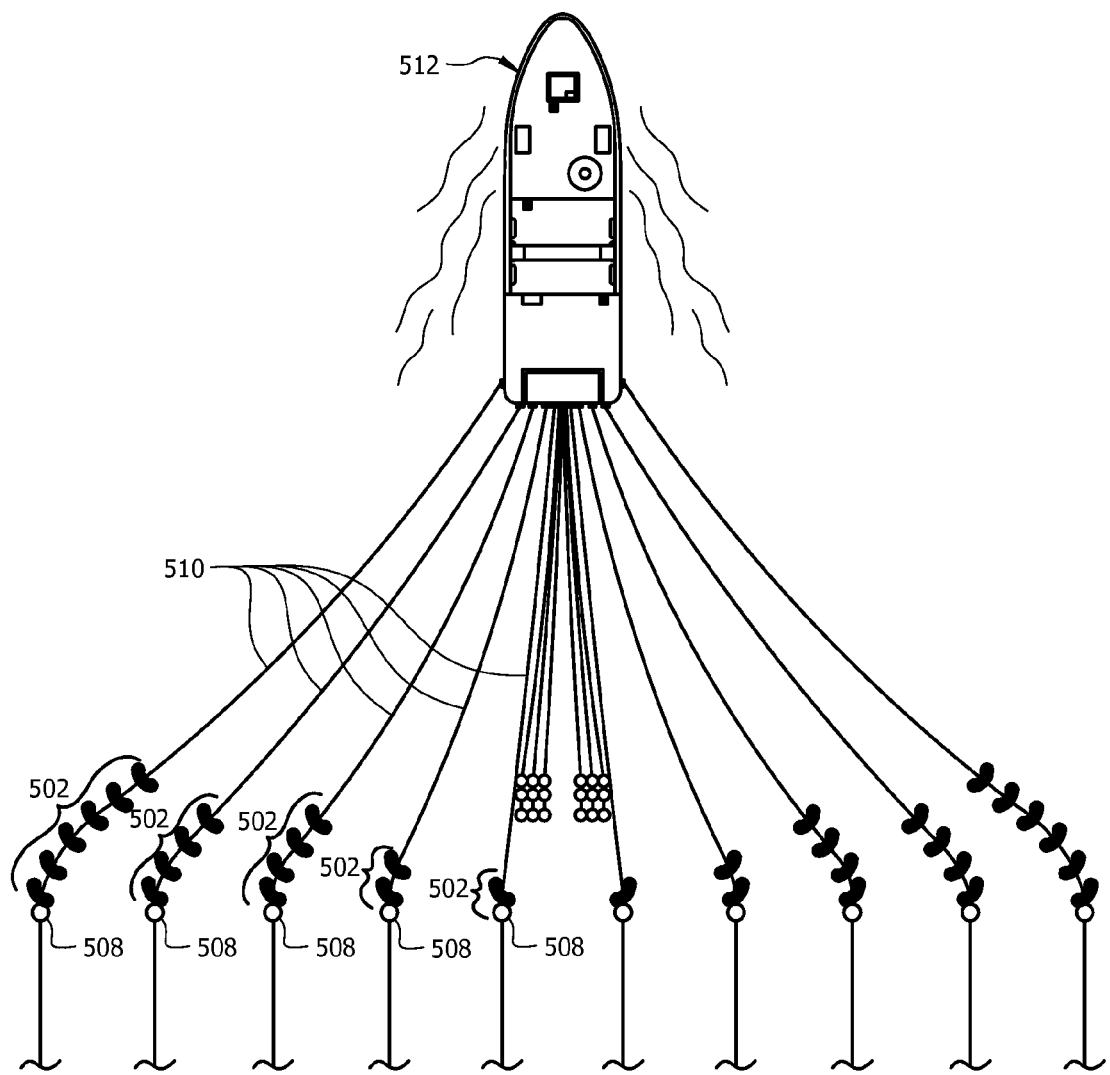
FIG. 5 is a top view of the preferred embodiment of the present invention where a series of wing units are installed on multiple lead-in cables.

Although FIG. 4 shows only one wing unit 402 towed from each lead-in cable 410, it is understood that there is no limit as to how many wing units could be installed per lead-in cable 410. FIG. 5 illustrates the application of multiple wing units 502 fastened to individual lead-in cables 510. For simplicity's sake, only the port side is labeled, but it is to be understood that the starboard side mirrors the port side. As can be seen in FIG. 5, the outboard cables of lead-in cables 510 have more than one wing units per cable, compared to the inner cables, thereby creating additional lift at the edges of the seismic array. For instance, FIG. 5 shows the number of wing units 502 ranging from six on the outboard cables to only one on the innermost cable. In other embodiments, it is envisioned that the number of wing units 502 per lead-in cable 510 can be varied as needed.

Referring to FIG. 5, when multiple wing units 502 are deployed on a single lead-in cable, adjacent tip vortices created by multiple wing units 502 will be co-rotating. As such, the tip vortices should be mutually destructive and lead to rapid attenuation of the multiple vortices. Further, only the aft-most of wing units 502 will be aligned stream-wise with its streamer cable 506; thus, the remaining wing units 502 that are upstream will be naturally offset from streamer cables 516 due to the catenary of lead-in cables 510 to which they are attached. Therefore, the combination of the diminished intensity tip vortices due to the small size of wing units 502, the mutually destructive property of adjacent co-rotating tip vortices, and the incremental lateral offset of successive wing units on the same lead-in cable allows wing units 502 to be fastened directly to lead-in cable 510 without concern that tip vortex intensities will disrupt the depth control capabilities of streamer birds 508 that lie downstream in the wake of the wing units 502.

Figure 6:
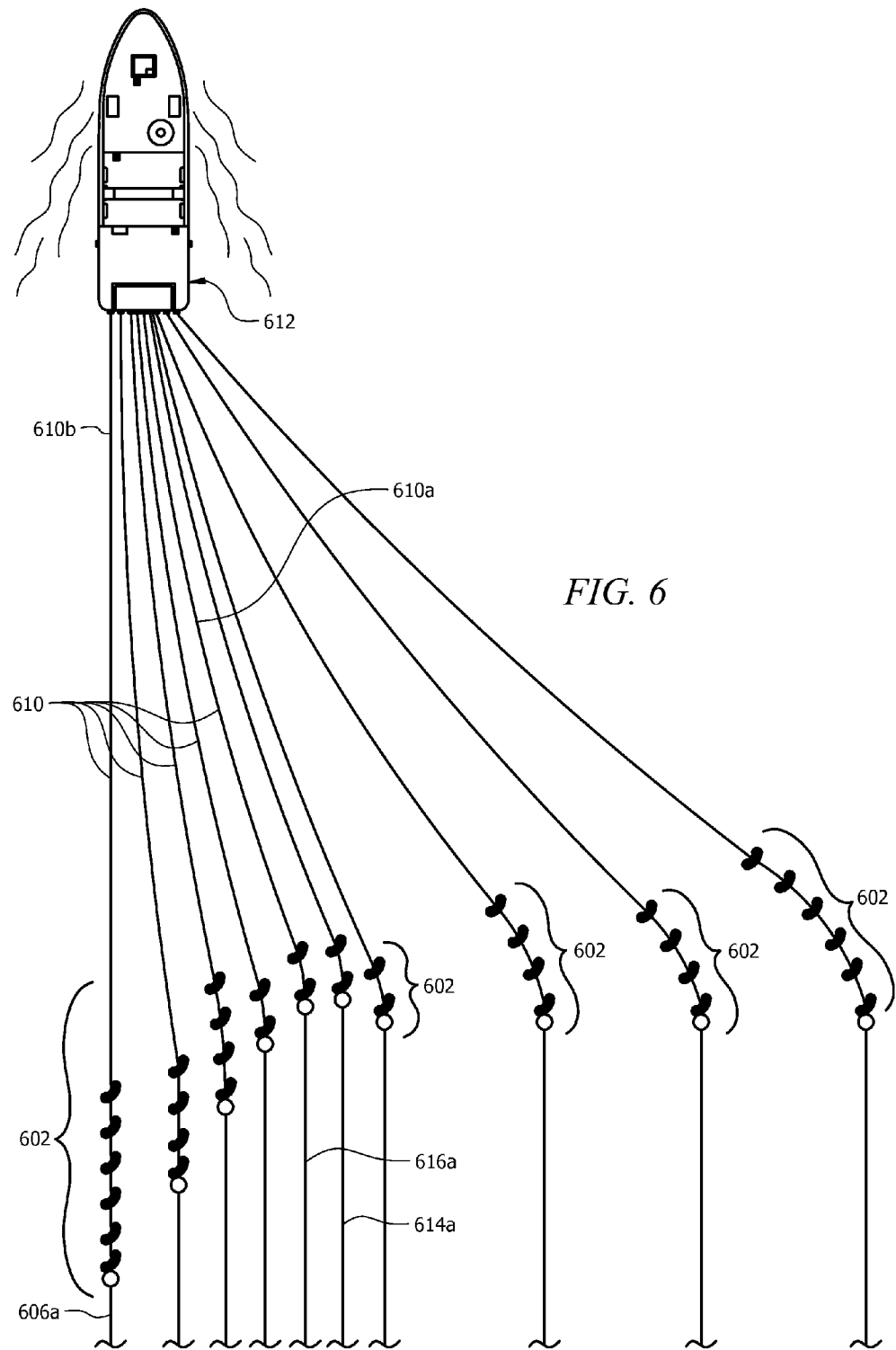
FIG. 6 is a top view of the stacking operation of the preferred embodiment of the present invention having a series of wing units installed on multiple lead-in cables.

As mentioned above, the present invention provides for an easy and quick stacking operation. As can be seen in FIG. 6, unlike the configurations of the prior art, initial pay-outs of lead-in cables 610, as well as replacing longer separation ropes with shorter taglines, are no longer necessary during the recovery portion of the stacking operations because paravanes and separation ropes are not being used. Likewise, the reverse of these steps are also eliminated during the re-deployment portion of the stacking operation. As such, the elimination of these time consuming steps associated with conventional configurations results in significant reduction in the time needed to perform stacking operations.

Referring to FIG. 6, during a stacking operation of the port side lead-in cables 610 to recover the outermost port side streamer 606a, wing units 602 on the four outermost cables of starboard side lead-in cables 614 do not need to be adjusted. Wing units 602 on the innermost starboard lead-in cable 614a are adjusted slightly to produce higher lift to move the innermost streamer 616a closer to the adjacent starboard streamer cable, innermost cable 614a. Wing units 602 on the innermost port side lead-in cable 610a are adjusted to produce near-zero lift, such that lead-in cable 610a falls straight inline, or nearly so, with seismic vessel 612. Wing units 602 on lead-in cable 610a are then instructed to execute a 180 degree roll, forcing cable 610a to move from the port side to the starboard side. Subsequently, these wing units 602 on lead-in cable 610a are adjusted again to begin producing lift, but now the lift is toward the starboard side of vessel 612. The steps of de-tuning to produce zero lift and executing a 180 degree roll, followed by a return to lift in the opposite direction, are executed for each subsequent port side lead-in cables 610 until all five port side lead-in cables 610 are stacked as depicted in FIG. 6.

As depicted in FIG. 6, outermost port side streamer cable 606a can now be recovered for maintenance, repair or replacement by hauling lead-in cable 610b in toward the stern of vessel 612. Once streamer cable 606a is repaired/and or replaced, the stacking procedure can now be executed in reverse to return the entire array to its original production configuration. That is, outermost streamer cable 606a is re-deployed, and wings 602 on outermost lead-in cable 610b are de-tuned to produce near zero lift and perform a 180 degree roll toward the port side, thereby moving lead-in cable 610b toward the port side. Wings 602 on lead-in cable 610b are then adjusted to produce lift toward the port side. These steps are repeated to move each subsequent lead-in cables 610 toward the port side, and wings 602 on all lead-in cables 610 are individually adjusted to produce lift toward the port side to re-establish the original depth and lateral offset of port side streamers 606. This stacking operation can be used to recover any streamer for inspection and repair, not just the outermost ones. As such, the elimination of paravanes, towing ropes, and separation ropes, and the maneuverability of individual wing units 602 provide for an efficient stacking operation, both in the time and energy required to complete such operation.

Figure 15:
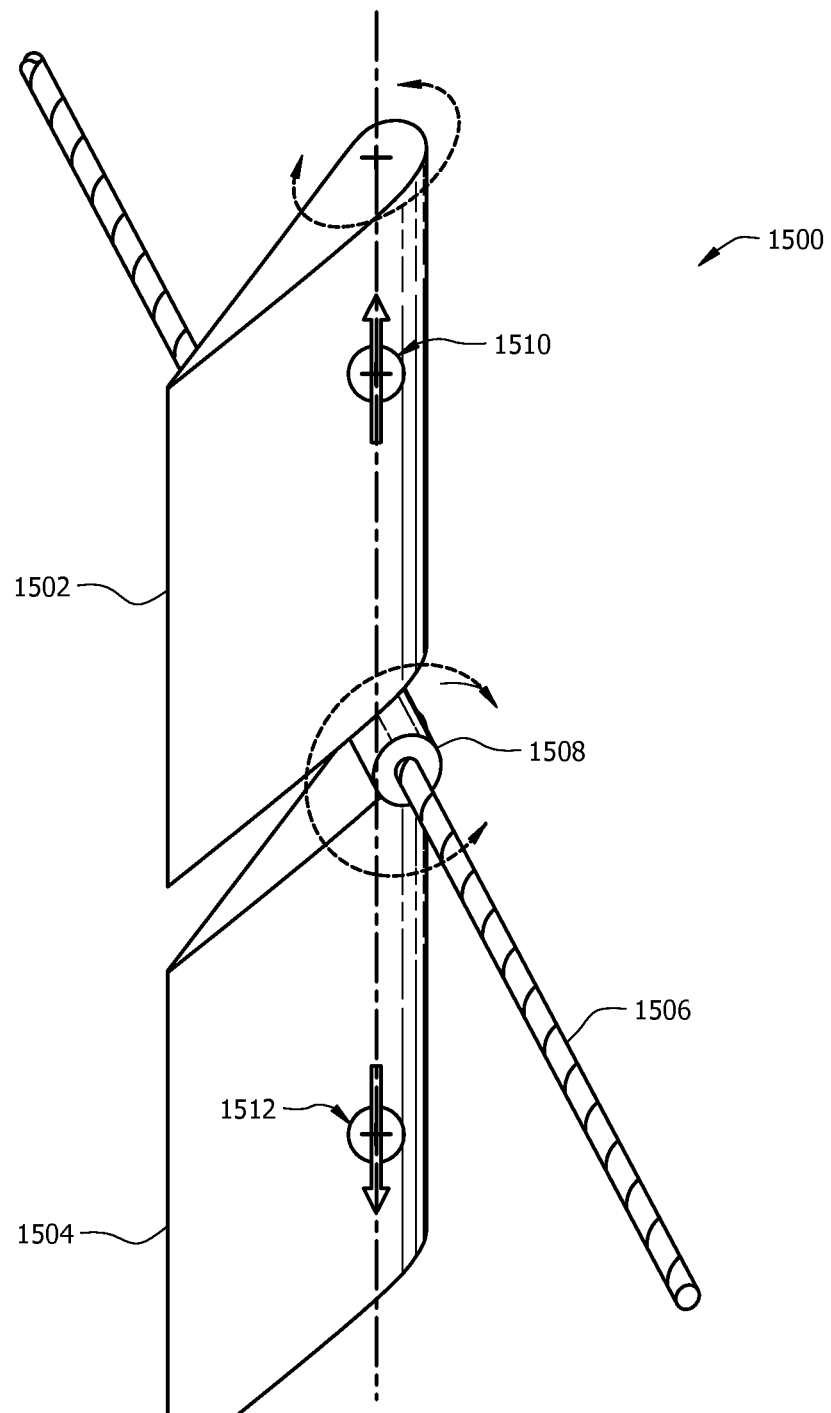
FIG. 15 is a perspective view of the sixth embodiment of the wing unit of the present invention.

Referring principally to FIGS. 7-11, the various embodiments of the wing unit of the present invention are based on a single hydrofoil that can be of various specific shapes. Referring to FIG. 15, it is also envisioned that the wing unit of the present invention comprises two portions, an upper and lower foil section. When scaled to a size that yields 3 square meters of active foil area, the various wing units depicted in FIGS. 7-11 and 15 are capable of providing 12 kilonewtons (kN) of lift and 2 kN of drag at 4.5 knots which gives a lift-to-drag ratio of 6:1. Further, these wing units are able to provide up to 15 kN of lift and 3 kN of drag, a 5:1 lift-to-drag ratio, to facilitate occasional requirements of increased spreading force.

Figure 7:
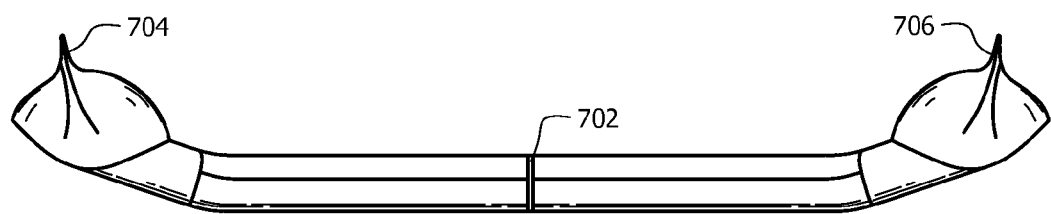
FIG. 7 is a front view of the first embodiment of the wing unit of the present invention.

Referring principally to FIG. 7, wing unit 700 has an essentially rectangular foil 702 and two pods, pod 704 and pod 706, attached to the tips or ends of foil 702. Wing unit 700 can accommodate wing tip pods of 30, 60 or 100 liters of internal volume. Pods 704 and 706 optimize vertical stability when the lower pod to be submerged is equipped to be the ballast and the upper pod is equipped to provide the buoyancy. Further, pods 704 and 706 act as endplates to enhance hydrodynamic performance. As can be seen in FIG. 7, the wing tips of wing unit 700 are slightly bent outward as wing unit 700 stands vertical when deployed and in operation. As such, pods 704 and 706 do not protrude into the pressure side of the overall wing profile. The total wing span of wing unit 700, including when various sized pods are attached, can be up to 3.3 meters. Wing unit 700 is easy to manufacture because it has a rectangular footprint with no slot, taper or sweptback foil. Pods 704 and 706 can take various shapes, which may depend on the required application.

Figure 8:
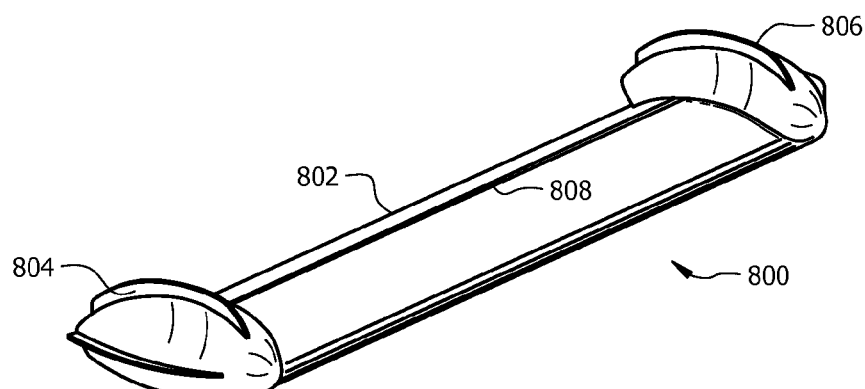
FIG. 8 is a perspective view of the second embodiment of the wing unit of the present invention.

Referring now to FIG. 8, wing unit 800 has essentially the same shape and dimensions as wing unit 700 depicted in FIG. 7. Wing unit 800 also has essentially rectangular foil 802 and two pods, 804 and 806, attached to the ends of foil 802. The pods are also similarly equipped to optimize vertical stability with the use of ballast and buoyancy between the lower and upper pods, respectively. Preferably, foil 802 of wing unit 800 contains slot 808 that runs laterally on the body of wing unit 800. The location, width, and contour of slot 808 is established to optimize the volume of high speed fluid that is injected into the suction side of wing unit 800. With the addition of slot 808, wing unit 800 can be operated at higher attack angles with reduced risks of stalling. Also, slotted wing unit 800 having a wing area of 3 m² can generate between 18 to 20 kN of lift at 4.5 knots, if required, which provides additional operations flexibility. As known in the art, the angle of attack is the angle between the lifting body's, i.e., wing unit 800, reference line and the oncoming flow.

Figure 9:
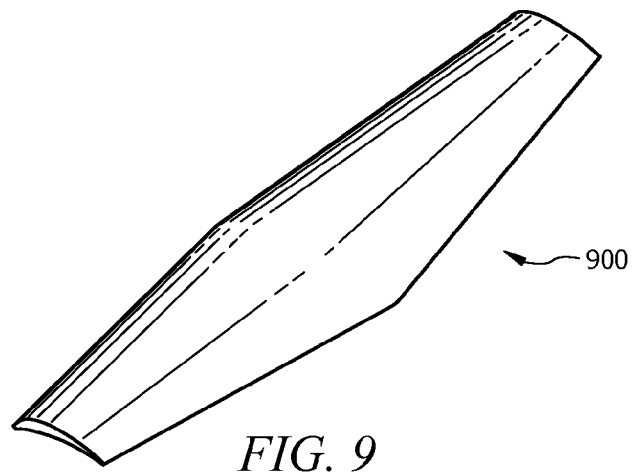
FIG. 9 is a perspective view of the third embodiment of the wing unit of the present invention.

In FIG. 9, wing unit 900 has essentially the same wing area of 3 m² as wing unit 700 and wing unit 800. As can be seen in FIG. 9, the difference here is that foil 902 of wing unit 900 has an aspect ratio of 4:1 with a wing span of 4 meters and a chord of 1 meter at the center that narrows to 0.5 meter toward the wing tips. Because of the tapering effect, wing unit 900 provides significant lift-to-drag performance with substantially high total lifts as well. As such, wing unit 900 does not have pods attached to the tips. Nevertheless, other embodiments are envisioned where wing unit 900 has pods attached, such as in applications that require additional vertical stability. Accordingly, if pods are attached to wing unit 900 then the outward bend may need to be added to prevent the pods from protruding into the pressure side of the overall wing profile. The outward bend may also be added to pod-less wing tips of wing unit 900 if the operation calls for further minimal protrusion of the wing tips into the pressure side. Moreover, it may also be desirable to add a slot to foil 902 of wing unit 900 for operations at higher attack angles while keeping the risk of stalling to a minimal.

Figure 10:
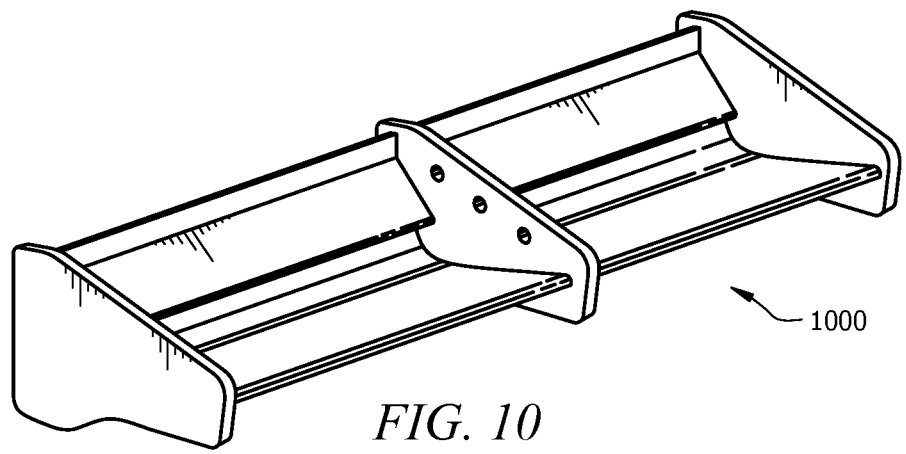
FIG. 10 is a perspective view of the fourth embodiment of the wing unit of the present invention.

Referring to FIG. 10, wing unit 1000 employs technology that is proprietary to the Danish corporation, Injector Trawldoors A/S, where individual foils are stacked together, leaving gaps between the foils to optimize flow characteristics. The distance between the foils and the angle of the foils are designed to optimize the flow characteristics for maximum lift while preserving nominal drag. Wing unit 1000 can also have a wing area of 2 to 3 $m^2$, and the aspect ratio between span and chord is preferably at least 4:1. The features of attaching pods to the wing tips, and adding the outward bends at the wing tips and a lateral slot can also be implemented for wing unit 1000 should the operation call for the installation of such features.

Figure 11:
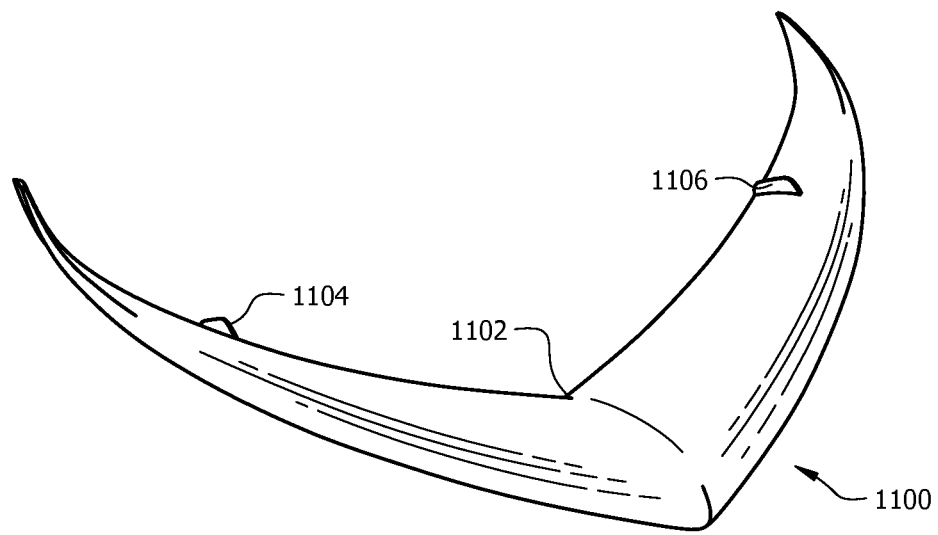
FIG. 11 is a perspective view of the fifth embodiment of the wing unit of the present invention.

Turning attention to FIG. 11, wing unit 1100 has the shape similar to a boomerang where foil 1102 has both the outward bends at the wing tips and tapering of foil 1102 toward the wing tips. In addition to the bends and tapering, foil 1102 no longer retains its essentially rectangular shape, but its shape resembles the letter V. The smooth, continuous, and significant sweptback wings may be useful for shedding submerged debris that wing unit 1100 may encounter. Also, appendages 1104 and 1106 can be added to foil 1102 near the wing tips of wing unit 1100 to further stabilize wing unit 1100. The features of pods at the wing tips can also be implemented for wing unit 1100 should the operation call for the installation of such features.

Referring to FIGS. 7-11, the single hydrofoil body of wing units 700-1100 can be constructed from any suitable material that is compatible with service in both a marine environment and onboard (or in deployment or retrieval from) a seismic vessel. For instance, any number of metals and alloys such as duplex steel, stainless steel, aluminum, titanium, plastics, and composites such as fiberglass and carbon fire can be suitable materials. Also, the span area of wing units 700-1000 can be between 1 $m^2$ and 6 $m^2$.

Figure 12:
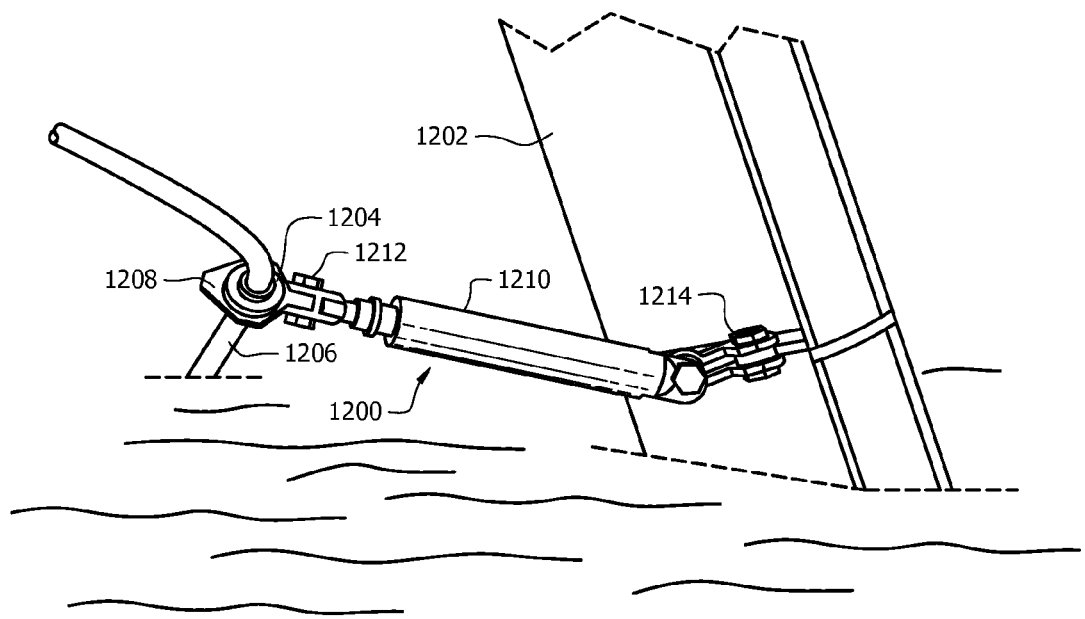
FIG. 12 is a perspective view of the first embodiment of the attachment means between the wing unit and the lead-in cable of the present invention.
Figure 13:
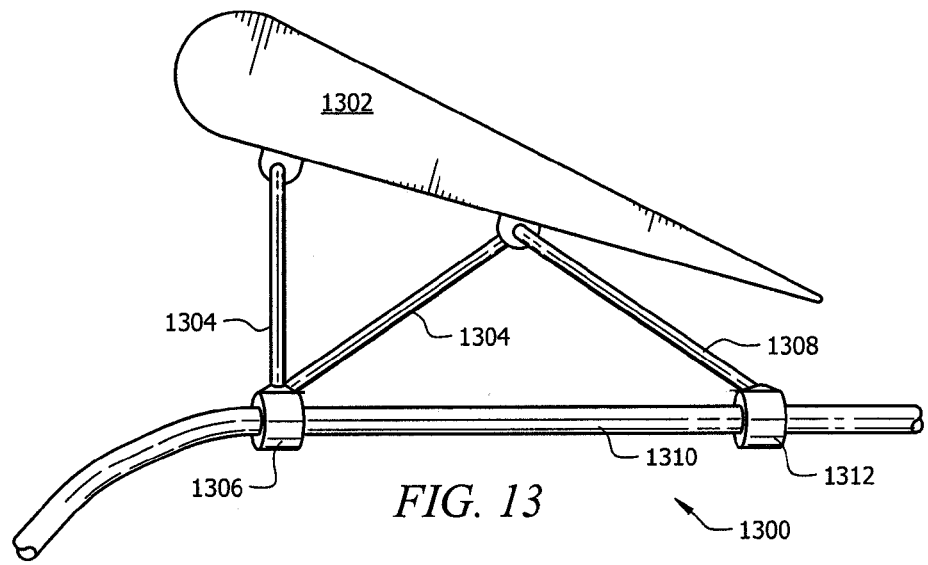
FIG. 13 is a side view of the second embodiment of the attachment means between the wing unit and the lead-in cable of the present invention.
Figure 14:
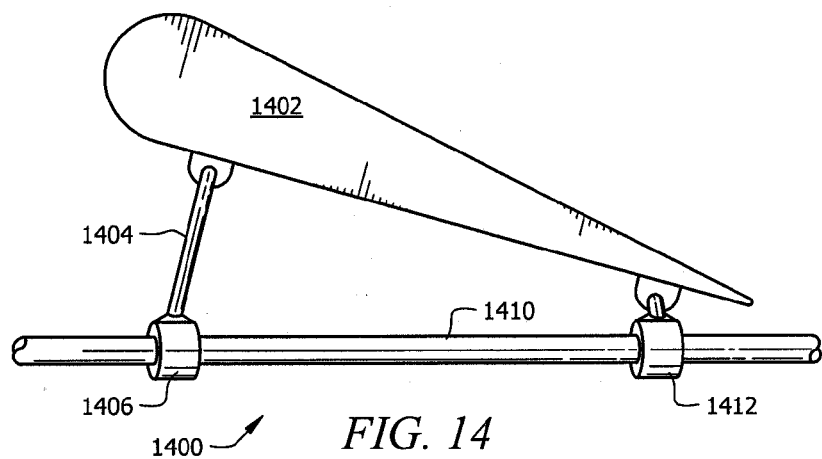
FIG. 14 is a side view of the third embodiment of the attachment means between the wing units and the lead-in cable of the present invention.

As discussed above, the wing units of the present invention are fastened directly to its lead-in cable rather than being tethered via taglines. The fastening, or attachment, means of the single hydrofoil wing units, depicted in FIGS. 7-11, is different from the attachment means of wing units having two separate foil sections, depicted in FIG. 15. In the former, one end of the attachment means is affixed to the lead-in cable while the other end is affixed to the hydrofoil wing unit such that it places the wing unit at a desired distance from the lead-in cable. Preferably, the distance between the hydrofoil wing unit and its lead-in cable is 1 meter or less. FIGS. 12-14 illustrate the first, second, and third embodiments of the attachment means to fasten single hydrofoil wing units directly to the lead-in cable, while FIG. 15 shows how a wing unit with an upper and lower foil portion is directly attached to the lead-in cable.

Referring to FIG. 12, the preferred embodiment of the first attachment means is shown as attachment means 1200. As seen in FIG. 12, bend restrictor 1204 is installed over lead-in cable 1206 where wing unit 1202 is to be attached. Swivel clamp 1208 is firmly affixed at the midpoint of bend restrictor 1204 to prevent slippage of swivel clamp 1208 along lead-in cable 1206. Preferably, swivel clamp 1208 provides wing unit 1202 a rotational freedom of 360 degrees around the axis of lead-in cable 1206 such that wing unit 1202 has no constraint in the roll orientation. Swivel clamp 1208 is attached to leg 1210 through a second attachment means, depicted here as mechanical joint 1212. In the preferred embodiment, joint 1212 allows for two degrees of freedom: (1) a 360 degree freedom of rotation around the axis of leg 1210, thus providing a full 360 degree freedom in pitch rotation for wing unit 1202 and (2) a ±90 degree freedom in yaw rotation at joint 1212. Leg 1210 is then attached to wing unit 1202 to allow wing unit 1202 to have ±90 degree of rotation in roll with respect to leg 1210, while being affixed rigidly in yaw. Attachment means 1200 also forces wing unit 1202 to only pivot on its yaw axis at joint 1212, rather than at the junction of leg 1210 and wing unit 1202 itself.

Turning now to FIG. 13, the preferred embodiment of the second attachment means is shown as attachment means 1300. As seen in FIG. 13, rigid bridle legs 1304 are connected to forward swivel clamp 1306, which is mounted on lead-in cable 1310. Forward swivel clamp 1306 is capable of providing wing unit 1302 a rotational freedom of 360 degrees in both pitch and roll. One end of restraint means 1308, which can be hunting restraint ropes, is attached to aft swivel clamp 1312, while the other end is connected to wing unit 1302. Preferably, the length of restraint means 1308 is set to prevent wing unit 1302 from surging forward beyond its targeted yaw orientation, or angle of attack. The angle of attack is determined by operational objectives of lead-in cable 1310 within the overall seismic array. Restraint means 1308 is collapsible inwards, a characteristic of ropes, which is advantageous in case wing unit 1302 collides with submerged debris because restraint means 1308 allows wing unit 1302 to swing aft in yaw until it comes into contact with lead-in cable 1310. While aft swivel clamp 1312 is capable of allowing up to ±90 degrees of freedom in yaw, restraint means 1308 and lead-in cable 1310 will constrain wing unit 1302 to tighter limits of yaw freedom.

Referring to FIG. 13, the length of legs 1304 is preferably equal to the chord of wing unit 1302. As such, legs 1304 and wing unit 1302 form an equilateral triangle; however, legs 1304 can have various lengths in other embodiments. Further, the forward bridle leg 1304 is preferably attached to wing unit 1302 in close proximity to the nose of wing unit 1302 while aft bridle leg 1304 is attached to wing unit 1302 closer to its tail. As seen, the attachment point of aft bridle leg 1304 on wing unit 1302 can, but is not required to, coincide with the attachment point of restraint means 1308.

Turning now to FIG. 14, the preferred embodiment of the third attachment means is shown as attachment means 1400. As can be seen in FIG. 14, one end of the rigid bridle leg 1404 is attached to wing unit 1402 in close proximity to its nose while the other end is attached to the forward swivel clamp 1406, which is itself attached to lead-in cable 1410. In the preferred embodiment, leg 1404 is hinge mounted at its attachment to wing unit 1402, which allows for some amount of flexibility in pitch, e.g., as much as ±30 degrees. Unlike attachment means 1300, the tail of wing unit 1402 is preferably attached directly to lead-in cable 1410 via aft swivel clamp 1412. Both forward swivel clamp 1406 and aft swivel clamp 1412 are capable of providing wing unit 1402 a rotational freedom of 360 degrees in roll. Because rigid bridle leg 1404 is at the leading edge of wing unit 1402 and the trailing edge is pinned to lead-in cable 1410, wing unit 1402 is completely constrained in yaw, meaning zero freedom of yaw oscillations.

Referring to FIG. 14, the length of leg 1404 is a function of both the particular location of lead-in cable 1410 within the overall seismic array, e.g., innermost cable versus outermost cable, and the specific position of wing unit 1402 itself on lead-in cable 1410, e.g., toward the stern or head of streamers and if there are multiple wing units per cable.

Referring to FIGS. 12-14, the freedom in roll, provided at both the lead-in swivel clamp as well as at the mechanical attachment point to wing units 1202, 1302, and 1402 in all three attachment means 1200, 1300, and 1400 allows wing units 1202, 1302, and 1402 to maintain a true vertical alignment on its vertical axis when in static towing equilibrium, regardless of whether wing units 1202, 1302, and 1402 are positively or negatively buoyant. Referring to FIGS. 12 and 13, the freedom permitting wing units 1202 and 1302 to find their own equilibrium in yaw provides the advantage of allowing wing units 1202 and 1302 to deflect out of the way when impacted by submerged debris, and swing back into its equilibrium position once the debris has passed. Preferably, legs 1204, 1304, and 1404 are constructed of marine grade structural steel for maximum strength and rigidity. In other embodiments, however, it is also envisioned that other metals, alloys or composites could be used just as effectively.

Referring to FIG. 12, adjustment to the angle of attack of wing unit 1202 is achieved by adjusting the location of mechanical joint 1214 where leg 1210 physically connects to wing unit 1202. As attachment point 1214 is moved either forward or aft along the center chord line of the foil body of wing unit 1202, wing unit 1202 will react to find a new equilibrium attack angle. There are three ways to move attachment point 1214, and hence, set the angle of attack of wing unit 1202. First, the location of mechanical joint 1214 can be set manually at time of deployment. Second, attachment means 1200 may be equipped with the proper hardware and software to communicate with the vessel so that the location of mechanical joint 1214 can be remotely controlled from the instrument room of the seismic vessel. Third, the location of mechanical joint 1214 can be controlled by an auto-pilot operation that continuously adjusts the location according to the signals received to maintain the respective streamer at a specified lateral position.

Referring to FIGS. 13-14, there are three ways to set the angle of attack of the wing units of the present invention having attachment means 1300 or 1400. First, the length of legs 1304 and 1404 can be manually set at the time of deployment from the stern of the vessel or subsequently adjusted, either by replacing the legs in use with legs of different lengths, or by using legs with a turnbuckle, or its equivalent, to adjust the length without having to exchange the legs. Second, legs 1304 and 1404 may be equipped with the proper hardware and software to communicate with the vessel so that the length of legs 1304 and 1404 can be remotely controlled from the instrument room of the seismic vessel. Third, the length of legs 1304 and 1404 may also be controlled by an auto-pilot operation that continuously adjusts the length of legs 1304 and 1404 according to the signals received to maintain the respective streamer at a specified lateral position. In the second and third steering options, legs 1304 and 1404 can be adjusted by an electric solenoid, a turnbuckle driven by an electric motor, or other equivalent standard means of actuated controls.

Now, referring principally to FIG. 15, unlike other wing unit embodiments, wing unit 1500 has upper foil section 1502 and lower foil section 1504. Between upper and lower foil sections 1502 and 1504 is lead-in cable 1506 that is deployed from the seismic vessel. As mentioned above, lead-in cable 1506 is used to tow a streamer cable (not depicted) behind the vessel to collect seismic data. A bend restrictor (not depicted) is installed over lead-in cable 1506 at the portion in between upper and lower sections 1502 and 1504. Swivel clamp 1508 is firmly affixed at the midpoint of the bend restrictor to prevent slippage of swivel clamp 1508 along lead-in cable 1506. Preferably, swivel clamp 1508 is able to provide 360 degrees of rotational freedom around the axis of lead-in cable 1506 such that wing unit 1500 has no constraint in the roll orientation. The arrows around swivel clamp 1508 indicate the freedom of movements for wing unit 1500 around swivel clamp 1008. Further, in the preferred embodiment, swivel clamp 1508 can provide up to 60 degrees of flexibility in pitch orientation, allowing wing unit 1500 to orient itself orthogonally to the axis of lead-in cable 1508 while allowing upper and lower foil sections 1502 and 1504 to oscillate in pitch up to 60 degrees in case wing unit 1500 is struck by submerged debris. Wing unit 1500 has 360 degrees freedom of rotation in both roll and yaw, as indicated by the arrows at the top of wing unit 1500.

In the preferred embodiment, upper and lower foil sections 1502 and 1504 are of equal size and cross section. Further, upper foil section 1502 of wing unit 1500 is positively buoyant above the axis of lead-in cable 1506, as indicated by circle 1510 showing the center of buoyancy for upper foil section 1552. Lower foil section 1504 is negatively buoyant below the axis of lead-in cable 1506, as indicated by circle 1512 showing the center of ballast for lower foil section 1512. The buoyancy and ballast differences in upper and lower foil sections 1502 and 1504 optimize stability in pitch and roll orientations of wing unit 1500. In the preferred embodiment, upper and lower foil sections 1502 and 1504 can be constructed from any suitable material that is compatible with service in both a marine environment and onboard (or in deployment or retrieval from) a seismic vessel. For instance, any number of metals and alloys such as duplex steel, stainless steel, aluminum, titanium, plastics, and composites such as fiberglass and carbon fire can be suitable materials.

Figure 16:
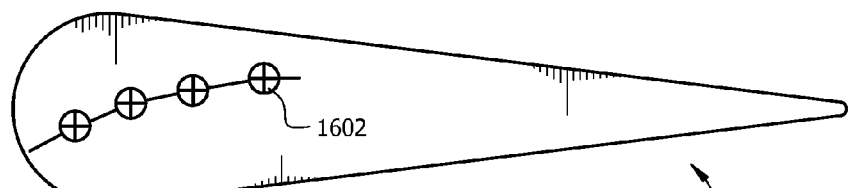
FIG. 16 is a side view of a foil section of the sixth embodiment of the wing unit of the present invention.
Figure 17:
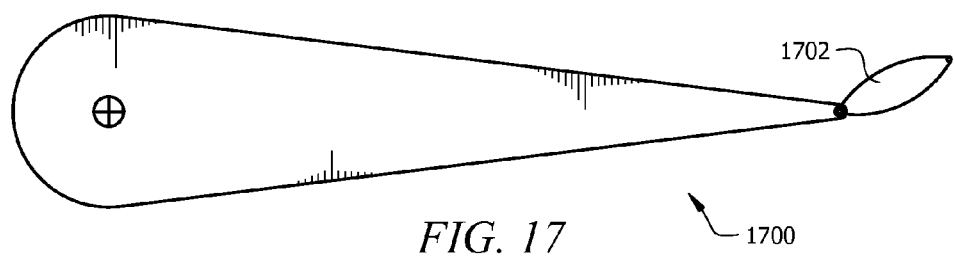
FIG. 17 is a side view of an aileron and a foil section of the sixth embodiment of the wing unit of the present invention.
Figure 18:
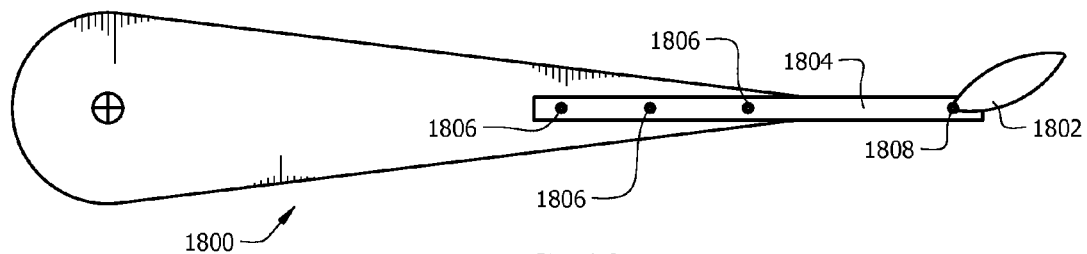
FIG. 18 is a side view of a tail wing and a foil section of the sixth embodiment of the wing unit of the present invention.

Referring principally to FIGS. 16-18, these figures illustrate the three ways to set the angle of attack of wing unit 1500, depicted in FIG. 15. Because both upper and lower foil sections of wing unit 1500 of FIG. 15 are preferably identical, only one foil section is depicted in FIGS. 16-18. Referring principally to FIG. 16, the first way to set the angle of attack is by manually selecting the specific center of yaw rotation of foil section 1600. As can be seen in FIG. 16, foil section 1600 has a plurality of centers of yaw rotation 1602 where a desired angle of attack can be achieved by selecting a particular center. Foil section 1600 is affixed in the position, determined by the selected center of yaw, to operate at the desired attack angle. Although in the preferred embodiment, the center of yaw rotation 1602 is manually set, other embodiments may be equipped with mechanical linkages that allows remote or automated control mechanism for selecting different centers of yaw rotation.

Referring to FIG. 17, the second way of setting the angle of attack is to employ adjustable aileron 1702 attached at the tail of foil section 1700. Aileron 1702 is attached to the tail of foil section 1700 such that aileron 1702 has the vertical freedom of rotation. That is, aileron 1702 can be set at any angle relative to foil section 1700. There are also three ways to set the angle of attack using adjustable aileron 1702. First, the attack angle of adjustable aileron 1702 can be manually set at the time of deployment from the stern of the vessel. Second, adjustable aileron 1702 may be properly equipped to communicate with the vessel where its attack angle can be remotely controlled from the instrument room of the seismic vessel. Third, adjustable aileron 1702 may be equipped with feedback controls for an auto-pilot operation that continuously adjust geo-wing 1500 of FIG. 15 according to the signals received to maintain a specified lateral position for the associated streamer cable.

Referring principally to FIG. 18, the third method to set the angle of attack of wing unit 1500 of FIG. 15 is with adjustable tail wing 1802. As seen in FIG. 18, adjustable tail wing 1802 is attached to foil section 1800 through strut 1804. Strut 1804 has a plurality of fixed pins 1806 to affix strut 1804 to foil section 1800 such that tail wing 1802 can be placed at various lengths from foil section 1800 by increasing or shortening the length of strut 1804. Tail wing 1802 is fastened to strut 1804 through adjustable pin 1808 such that tail wing 1802 can be set at any desired angle. As such, this arrangement allows tail wing 1802 to be adjustable in both the distance from foil section 1800 and the angle with respect to strut 1804. The combination of these adjustable factors provides the flexibility to set the desired angle of attack of wing unit 1800. Similar to aileron 1802, the desired angle of attack can be set by adjusting tail wing 1802 manually, remotely through controls from the instrument room of the seismic vessel, or automatically through the feedback loop. Of course, tail wing 1802 must be equipped with the proper equipment for remote and automatic control operations.

Referring to FIGS. 16-18, while the different ways of setting the attack angle of wing unit 1500 have been described separately, they can be combined to adjust the angle of attack. For instance, a foil section may have a plurality of centers of yaw rotation similar to the ones depicted in FIG. 16 and either an adjustable aileron as depicted in FIG. 17 or an adjustable tail wing as depicted in FIG. 18. As such, in either combination, the plurality of centers of yaw rotation provides a coarse adjustment of the attack angle at the time of deployment while the adjustable aileron or tail wing provides the fine tuning of the attack angle either remotely or automatically.

Referring to FIG. 15, the independent movements of upper and lower foil sections 1502 and 1504 allow each foil section to find its own equilibrium angles of attack if this is desired. Further, the individual control of attack angles for each foil section allows for feedback controls to provide roll stability to wing unit 1500 without the need for adding buoyancy and ballasting to upper and lower foil sections 1502 and 1504. More importantly, independent operations of the foil sections also permit wing unit 1500 to be inverted at will by imposing 180 degrees of roll. As such, wing unit 1500 could force lead-in cable 1506 to move in the opposite direction, e.g., from a port side lateral position to a starboard side lateral position, or vice versa. As discussed above, this maneuverability of wing unit 1500 is advantageous in stacking operations. Referring to FIGS. 12-14 and 17-18, although the steerable bridle legs, ailerons, and tail wings have been described separately, it is envisioned that in some embodiments, adjustable bridle legs are used in combination with adjustable ailerons and/or tail wings.

Referring to FIGS. 7-15 and 17-18, steerable wing units 700-1100 equipped with either remotely or automatically controlled bridle legs of attachment means 1200, 1300, or 1400 and steerable wing unit 1500 equipped with either remotely or automatically controlled aileron 1702 or tail wing 1802 are able reduce their own angle of attack to zero degrees, such that near-zero lift is generated. De-tuning of the wing unit to near zero degrees must be done prior to executing a 180 degree rotation in roll orientation. Otherwise, the wing unit would generate significant up-force, or down-force, on the respective lead-in cable as it rotates through the horizontal plane. As previously discussed, the ability to execute a 180 degree rotation in roll is highly advantageous and desirable, particularly when the need arises to stack lead-in cables to either side of the vessel during streamer cables maintenance, repair or replacement operations.

Figure 19:
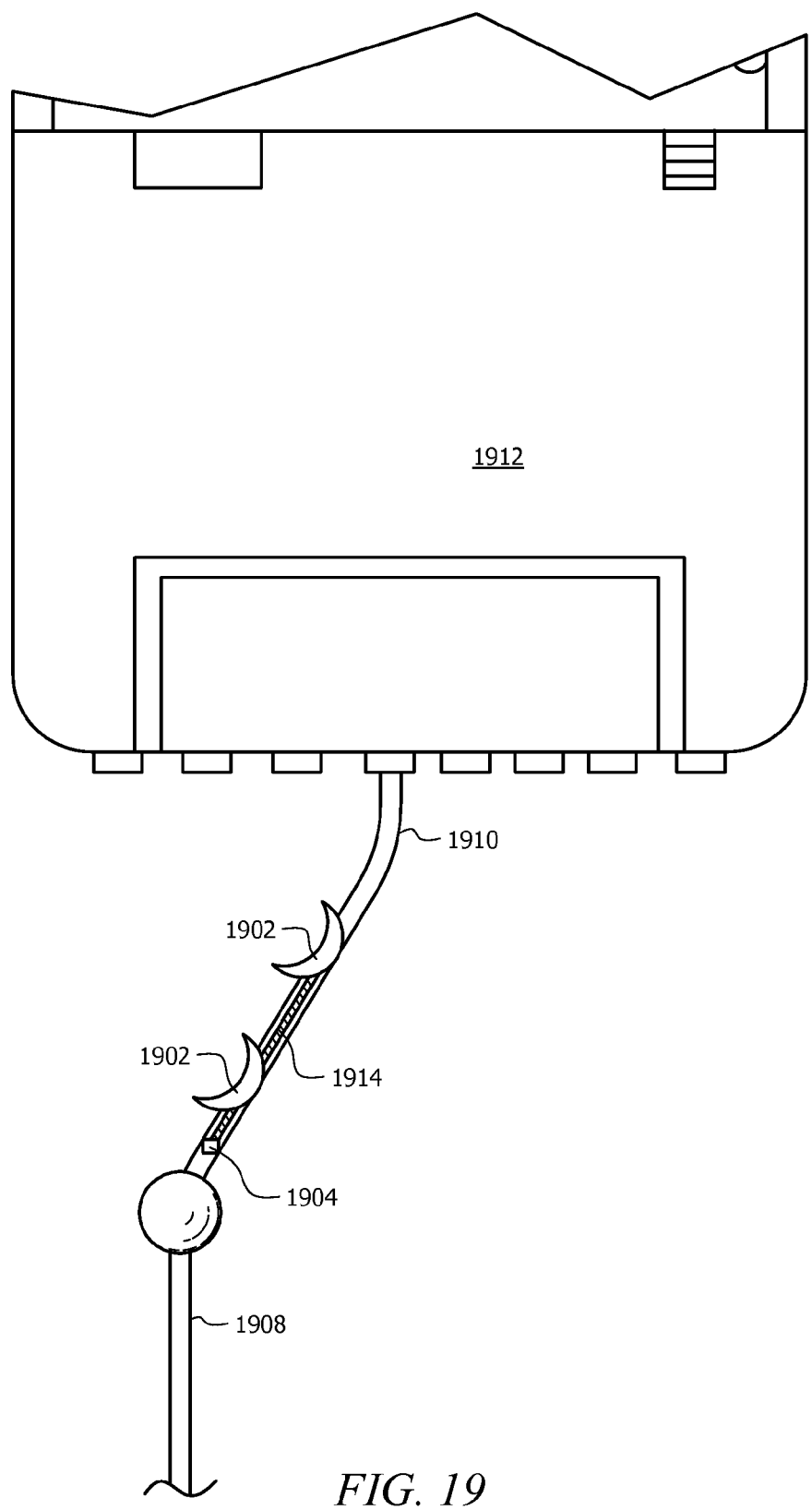
FIG. 19 is an enlarged top view of a lead-in cable of the present invention.

Referring now to FIGS. 7-15 and 17-21, there are three ways for a wing unit equipped with one of the following: adjustable bridle legs, adjustable aileron, or adjustable tail wing, to remotely communicate with the seismic vessel. First, referring principally to FIG. 19, wing units 1902 can conduct direct communications with vessel 1912 through the lead-in cable 1910 to which wing units 1902 are attached. The direct communication can be achieved electrically or optically. For example, a communication signal starts at the vessel and travels down lead-in cable 1910 to tap-can 1904. As shown in FIG. 19, tap-can 1904 is located at the wet-end termination 1906 of lead-in cable 1910, i.e., the end that is attached to streamer 1908; however, in other embodiments, it is envisioned that tap-can 1904 can be located at wing units 1902 themselves. Tap-can 1904 provides a physical connection to which one end of communication cable 1914 connects while the other end of communication cable 1914 connects to wing units 1902. Communication cable 1914 allows vessel 1912 to communicate with wing units 1902 and can provide power to wing units 1902, if necessary. Wing units 1902 can also be powered by battery, or a combination of both. As seen in FIG. 19, for embodiments with multiple wing units installed per lead-in cable, tap-can 1904 must be capable of servicing all wing units 1902 via cable 1914, which runs from tap-can 1904 to the first of wing units 1902, then to all subsequent wing units 1902. Alternatively, at least one tap-can must be installed at each wing unit location to provide a connection between the wing unit and the lead-in cable.

Figure 20:
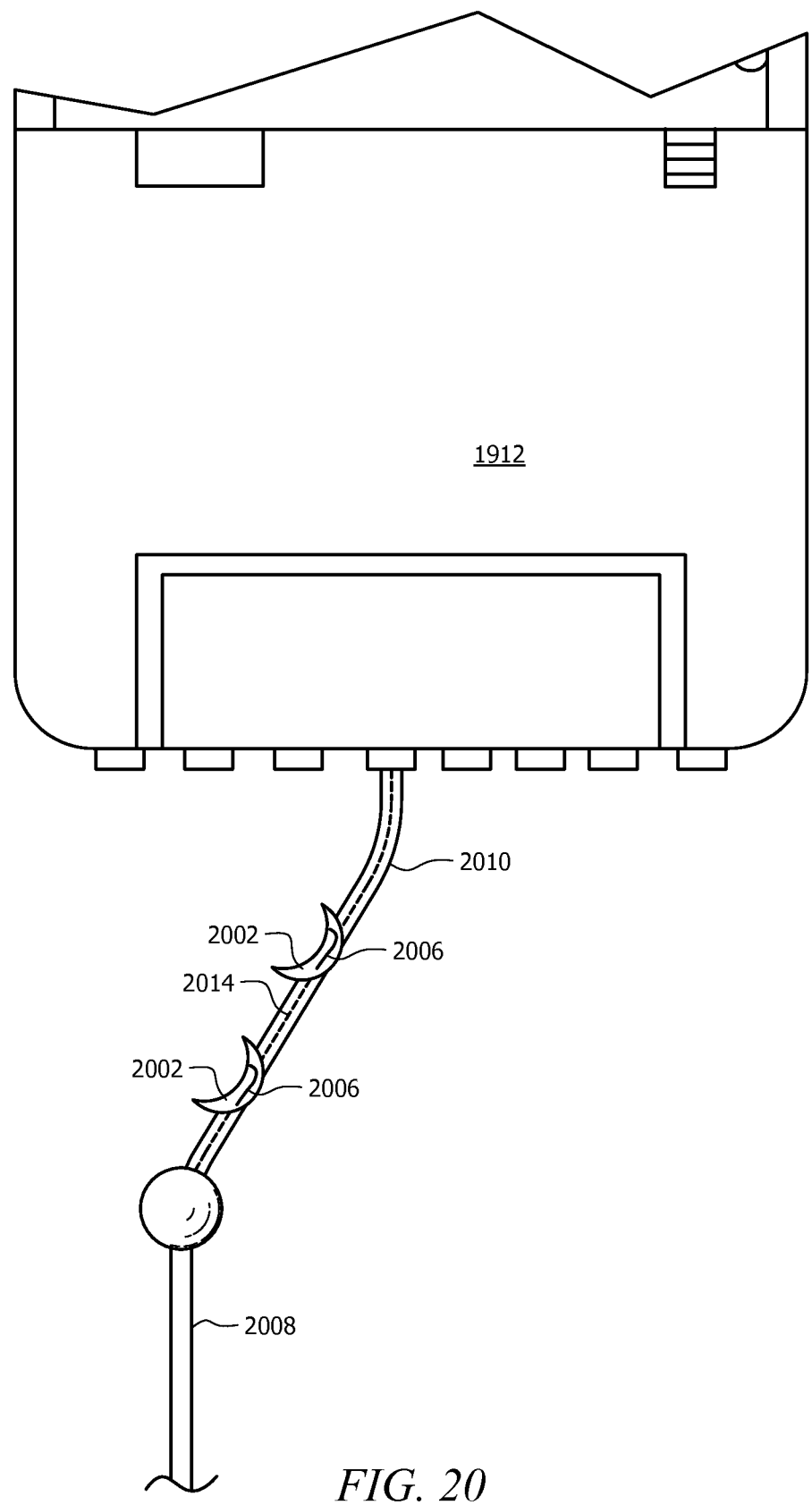
FIG. 20 is an enlarged top view of a lead-in cable of the present invention.

Second, referring to FIG. 20, wing units 2002 can be remotely steered through inductive communication using fluctuating magnetic field to transmit a communications signal from vessel 2012. That is, communication coil 2014 is physically wired into lead-in cable 2010 for power and communication purposes. As can be seen in FIG. 20, coil 2014 ends at the wet-end termination of lead-in cable 2010. Alternatively, coil 2014 can be connected at the individual location of wing units 2002. As shown, there is only one coil 2014 embedded in lead-in cable 2010. In embodiments with multiple wing units installed per lead-in cable, however, each of wing units 2002 can have its own dedicated coil embedded within lead-in cable 2010 for communications with vessel 2012.

Coil 2014 receives communication signals sent from vessel 2012 and interprets such instructions to generate an alternating current through the body of coil 2014 itself. The fluctuating current, in turn, generates a fluctuating magnetic field around the body of coil 2014. This fluctuating magnetic field transmits the communication signals sent from vessel 2012 that can be received by coils 2006, which are embedded in wing units 2002. As seen, coils 2006 are in close proximity to coil 2014 for inductive communications. One potential location is the swivel clamp of wing units 2002. Both coils 2014 and 2006 are transceivers that are capable of both transmitting and receiving inductive communications to and from one another.

The inductive communication is advantageous because communications can be achieved without requiring direct electrical or optical contact that would otherwise require special water tight connectors. Another advantage of using the coils for communication is that communications can be established without imposing any constraints on the rotational freedom of wing units 2002, compared to a physical connector.

Figure 21:
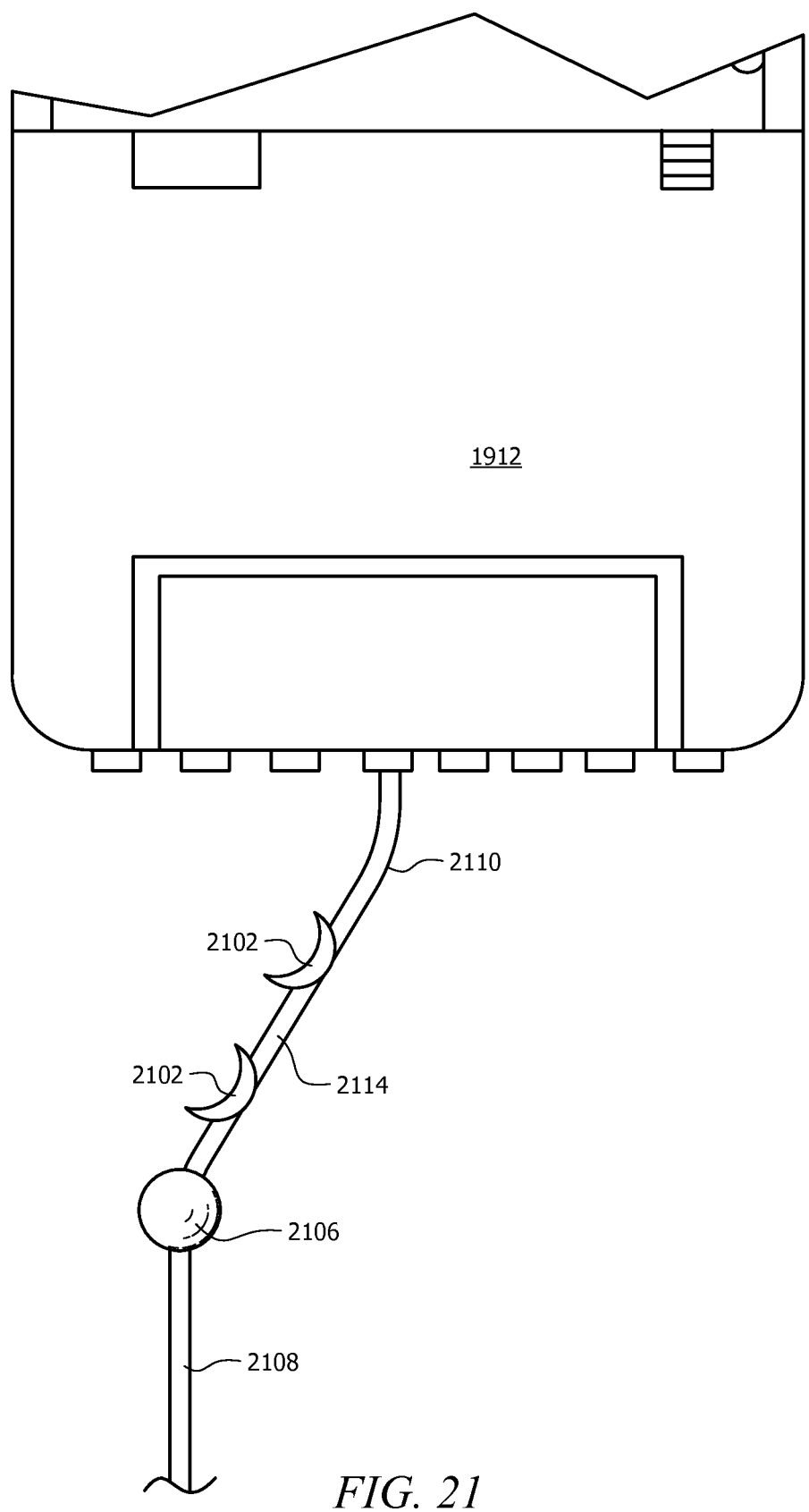
FIG. 21 is an enlarged top view of a lead-in cable of the present invention.

Third, referring to FIG. 21, wing units 2102 can be remotely controlled via a two-step scheme, whereby vessel 2112 first communicates the signals, via radio link, to the existing Range Global Positioning System (RGPS) pods on the primary lead-in head float 2106. Subsequently, the RGPS gear relays the communication signals to individual wing units 2102 via an acoustic modem (not shown). As such, head float 2106 and wing units 2102 must be equipped with acoustic transceivers (not shown).

Referring to FIGS. 7-15 and 17-21, principally to FIGS. 19-21, for each of the three ways for remote communications described above, the seismic vessel is equipped with a control console that displays the lateral offset, with respect to a reference position, of each lead-in and streamer cable in the deployed seismic array. This same display also includes the lateral displacement of each cable with respect to the line heading of the seismic array. An operator monitors these offsets and lateral positions to assess whether these positions are within required geophysical tolerances for the survey in progress. If not, the operator can correct the position of a cable by sending adjustment signals to the wing units attached to the lead-in cable that needs to be moved via one of the three methods previously discussed. The adjustment signals contain instructions to either increase or decrease the angle of attack of the attached wing units to either increase or decrease the lateral position of the respective lead-in cable, and hence, the attached streamer within the seismic array.

It takes some minutes for the small adjustments to the attack angle to take effect and for the targeted cable to asymptotically approach its new equilibrium lateral position within the array. Consequently, to remotely control the wing units, it requires an experienced operator to apply the proper incremental adjustment necessary to correct the lateral position of a particular cable and to determine the adequate period of time after which the adjustment has taken effect to bring the cable to within its assigned operational tolerance. Due to the non-zero response time required for each cable to achieve a new equilibrium position, operator intervention would be restricted to only occasional corrections to try and foresee and prevent cables from wandering outside of their desired lateral tolerances.

Referring also to FIG. 5, for inboard cables where it is preferable to have a single wing unit installed, lateral positioning is controlled through instructions to that single wing unit. For outboard cables where it is preferable to have multiple wing units deployed, two options are available. First, the angle of attack of all wing units of the respective outboard lead-in cable is adjusted simultaneously. This is advantageous because all wing units on the same cable are always maintained at the same angle of attack such that all the wing units of that cable are applying the same amount of lift to that lead-in cable. Alternatively, there is a single remotely controllable wing unit while the rest of the wing units on the same cable have a fixed attack angle, which is set at the time of deployment. Having only one remotely controllable wing unit significantly reduces the cost and complexity of the remote steering system, as the fixed attitude wing units require no steering hardware, e.g., ailerons or adjustable bridle legs, and no communications gear, e.g., communication coils, tap-cans, or acoustic modems. Those experienced in the art will realize that other configurations of remotely controllable and fixed units are possible to optimize the overall steering capacity and the redundancy of the steering control.

A steering system that is automatically adjusted has the same components as the remote steering described above. The main difference is that in place of an operator inputting the adjustments based on personal judgment, software algorithms are used to automatically adjust the positions of individual cables based on received signals. The lateral position of the individual cables for the automatic system is monitored in the same manner as the remote system, but the software logic makes the adjustments rather than the operator. The software routines are preferably programmed to use a collection of experience, accumulated with the remote control system, to determine the time constants to implement that will allow the streamers to reach equilibrium in different operational and environmental conditions. The software routines can use a variety of geophysical, oceanographic, operational and meteorological inputs to optimize the configuration of the towed equipment.

Figure 22:
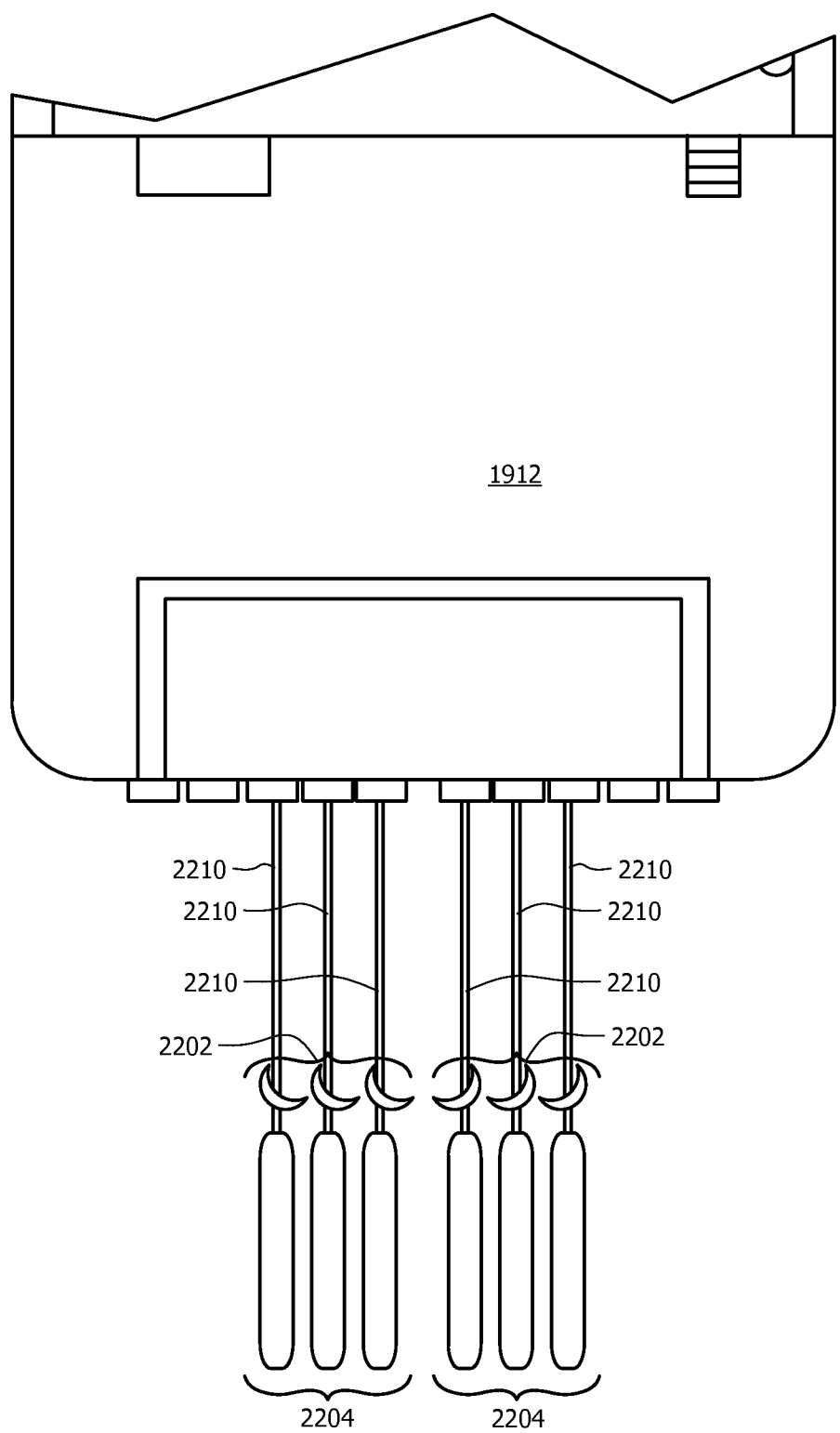
FIG. 22 is a top view of the seismic sources of the present invention.

Referring to FIG. 22, the wing unit of the present invention can also be installed to umbilical cables of the seismic source to provide the same benefits that these wing units provide to the seismic array. As seen in FIG. 22, seismic sources 2204 are towed behind vessel 2212 via umbilical cables 2210. In the preferred embodiment, at least one wing unit 2202 is installed on each umbilical cable 2210. By employing at least one dedicated wing unit per umbilical cable, taglines used in the flexible seismic source arrays are eliminated. Consequently, the elimination of such taglines reduces the sensitivity of the system to slight deviations of the position of seismic sources 2204 positioning and variations of the separation between adjacent lead-in and streamer cables that regularly occur during a seismic array operation. In alternative embodiments, because the required spread of the seismic sources in the seismic subarray is less than that of the streamer cables in the seismic array, one wing unit 2202 can be attached to more than one umbilical cables 2210. That is, one diverter 2202 can be attached to more than one umbilical cables 2210 or each umbilical cable 2210 can have one or more diverters 2202 attached.

Referring to FIG. 22, wing units 2202 can be a single hydrofoil like the embodiments depicted in FIGS. 7-11 or comprise upper and lower foil sections, like the embodiment of FIG. 15. If wing unit 2202 is a hydrofoil, then it can be attached to umbilical cable 2210 via the attachment means of FIG. 12, 13, or 14. If wing unit 2202 has two foil sections, then umbilical cord 2210 is attached to it between the foil sections, as lead-in cable 1510 is attached to wing unit 1502 depicted in FIG. 15. The bridle legs of the attachment means of the single hydrofoil wing unit and the aileron or tail wing of the wing unit with two foil sections can be steered, i.e., angle of attack being set or adjusted, manually, remotely, or automatically, in the same manner as described for the wing units attached to the lead-in cables. For instance, in the direct and inductive communication option, cables providing communications and/or power are attached to the umbilical cable rather than the lead-in cable. As for the two-step option, communications are still conducted with a radio link, but via the RGPS gear on the subarray floats (not shown) of seismic sources 2204, rather than on the primary head floats, and both the wing units and subarray floats must be equipped with acoustic transceivers.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A marine seismic array, comprising:
   seismic streamers;
   cables, each of said cables having a first end engaged with a seismic vessel and a second end attached to one of said seismic streamers; and
   one or more diverters directly attached to each of said cables,
   wherein
      a first number of diverters are attached to a first cable among the cables, and a second number of diverters are attached to a second cable among the cables, the first number being a smallest number of the diverters attached to one of the cables, the second number being a largest number of the diverters attached to another one of the cables and the second number being different from the first number, and
      at least one cable among the cables has attached an intermediate number of diverters that is between the first number and the second number.

2. The marine seismic array of claim 1 wherein each of said one or more diverters is submerged under water such that not to require a dedicated surface reference float.

3. The marine seismic array of claim 1, wherein at least one diverter among said one or more diverters is capable of executing a 180 degree roll around said cable such that, after said roll, said at least one diverter generates lift in a lateral direction that is opposite to an initial orientation of said at least one diverter.

4. The marine seismic array of claim 1 wherein at least one diverter among said one or more diverters comprises a single hydrofoil.

5. The marine seismic array of claim 4, wherein said single hydrofoil includes a substantially rectangular foil body, and said at least one diverter further comprises:
   a first pod attached to a first end of said foil body; and
   a second pod attached to a second end of said foil body, wherein said foil body is bent outward at said first and second ends.

6. The marine seismic array of claim 4, wherein said at least one diverter is directly attached to said each of said cables through an attachment means.

7. The marine seismic array of claim 6, wherein said attachment means comprises:
   at least one swivel clamp affixed to said each of said cables; and
   at least one leg, wherein a first end of said at least one leg is attached to said at least one diverter and a second end of said at least one leg is attached to said at least one swivel clamp.

8. The marine seismic array of claim 7, wherein said attachment means further comprises:
   a restraint means, wherein a first end of said restraint means is attached to said at least one diverter and a second end of said restraint means is attached to a second swivel clamp.

9. The marine seismic array of claim 7, wherein a tail of said at least one single hydrofoil diverter is attached to said each of said cables through a second swivel clamp.

10. The marine seismic array of claim 7, wherein a length of said at least one leg is adjustable such that an angle of attack of said at least one diverter is controlled by adjusting said length.

11. The marine seismic array of claim 10 wherein the length of said at least one leg is adjusted remotely.

12. The marine seismic array of claim 10, wherein the length of said at least one leg is automatically adjusted to maintain a desired lateral position of said at least one diverter.

13. The marine seismic array of claim 7, wherein an angle of attack of said at least one diverter is controlled by adjusting a location where said at least one leg is attached to said each of said one or more diverters along a chord of said at least one diverter.

14. The marine seismic array of claim 13, wherein the location where said at least one leg is attached to said at least one diverter is remotely controlled.

15. The marine seismic array of claim 13, wherein the location where said at least one leg is attached to said at least one diverter automatically moves along the chord of said at least one diverter to maintain a desired lateral position of said at least one diverter.

16. The marine seismic array of claim 1, wherein at least one diverter among said one or more diverters comprises:
   an upper foil section and a lower foil section, where said at least one diverter is directly attached to one of said cables at a junction between said upper and lower foil sections.

17. The marine seismic array of claim 16, wherein said at least one diverter further comprises:
   a first aileron attached to a tail of said upper foil section; and
   a second aileron attached to a tail of said lower foil section, wherein an angle of attack of said at least one diverter is controlled by adjusting at least one of said first and second ailerons.

18. The marine seismic array of claim 17 wherein at least one of said first and second ailerons is controlled remotely.

19. The marine seismic array of claim 17 wherein at least one of said first and second ailerons automatically adjusts the angle of attack of said at least one diverter to maintain a desired lateral position of said at least one diverter.

20. The marine seismic array of claim 16, further comprising:
   one or more struts having a first end and a second end; and
   at least one tail wing, wherein the first end of said one or more struts is attached to said at least one tail wing and the second end of said one or more struts is attached to a tail of at least one of said upper and lower foil sections.

21. The marine seismic array of claim 20 wherein said at least one tail wing is controlled remotely.

22. The marine seismic array of claim 20 wherein said at least one tail wing automatically adjusts the angle of attack of said at least one diverter to maintain a desired lateral position of said diverter.

23. The marine seismic array of claim 16 wherein at least one of said upper and lower foil sections comprises:
   a plurality of centers of yaw rotation, wherein each of said centers of yaw rotation, if selected, sets a different angle of attack of said at least one diverter.

24. The marine seismic array of claim 1, wherein the second cable is an outboard cable.

25. The marine seismic array of claim 1, wherein said one or more diverters are positioned closer to the second end of said each of the cables than to the first end thereof.

26. A marine seismic source subarray comprising:
   seismic sources;
   cables, each of said cables having a first end engaged with a seismic vessel and a second end attached to one of said seismic sources; and
   one or more diverters attached to each of said cables, wherein
      a first number of the diverters are attached to a first cable among the cables, and a second number of diverters are attached to a second cable among the cables, the first number being a smallest number of the diverters attached to one of the cables and the second number being a largest being number of the diverters attached to one of the cables, and
      at least one cable among the cables having attached an intermediate number of diverters that is between the first number and the second number.

27. The marine seismic source subarray of claim 26 wherein at least one diverter among said one or more diverters is submerged under water such that said at least one diverter does not require a dedicated surface reference float.

28. The marine seismic source subarray of claim 26, wherein at least one diverter among said one or more diverters comprises a single hydrofoil.

29. The marine seismic source subarray of claim 28, wherein said at least one diverter is directly attached to said each of said cables through an attachment means.

30. The marine seismic source subarray of claim 26, wherein at least one diverter among said one or more diverters comprises:
   an upper foil section and a lower foil section, wherein said at least one diverter is directly attached to each of said cables at a junction between said upper and lower foil sections.

31. A method for towing equipment related to a marine seismic survey, comprising:
   attaching plural cables having a first end engaged with a seismic vessel and a second end attached to a seismic streamer or to a seismic source
   attaching one or more diverters directly to each of plural cables, each of said plural cables,
   wherein a first number of diverters are attached to a first cable among the cables, and a second number of diverters are attached to a second cable among the cables, the first number being a smallest number of the diverters attached to one of the cables, the second number being a largest being number of the diverters attached to one of the cables and the second number being different from the first number, and
   a cable among the cables has attached an intermediate number of diverters that is between the first number and the second number.

32. The method of claim 31 further comprising:
   adjusting said one or more diverters to produce a near-zero lift; and
   directing said at least one diverter among said one or more diverters to execute a 180 degree roll such that after said roll, at least one of said plural cables directly attached to said at least one diverter is moved laterally opposite to an initial direction.

33. The marine seismic array of claim 1, wherein no ropes link the seismic streamers and/or seismic sources to maintain an intended geometry while towed.

34. The marine seismic array of claim 1, wherein the one or more diverters are individually adjustable.

35. The marine seismic source subarray of claim 26, wherein no towrope or towline is attached between the cables to maintain lateral separations of the seismic streamers.

\* \* \* \* \*